(12) United States Patent
Malaika et al.

(10) Patent No.: US 10,373,297 B2
(45) Date of Patent: Aug. 6, 2019

(54) USING PUPIL LOCATION TO CORRECT OPTICAL LENS DISTORTION

(71) Applicant: Valve Corporation, Bellevue, WA (US)

(72) Inventors: Yasser Malaika, Seattle, WA (US); Dan Newell, Medina, WA (US); Gordon Wayne Stoll, Sammamish, WA (US)

(73) Assignee: Valve Corporation, Bellevue, WA (US)

( * ) Notice: Subject to any disclaimer, the term of this patent is extended or adjusted under 35 U.S.C. 154(b) by 185 days.

(21) Appl. No.: 15/335,194

(22) Filed: Oct. 26, 2016

(65) Prior Publication Data

US 2018/0114298 A1   Apr. 26, 2018

(51) Int. Cl.
| | |
|---|---|
| G06T 5/00 | (2006.01) |
| G06F 3/01 | (2006.01) |
| G02B 27/01 | (2006.01) |
| G02B 27/00 | (2006.01) |

(52) U.S. Cl.
CPC .......... G06T 5/006 (2013.01); G02B 27/0093 (2013.01); G02B 27/0172 (2013.01); G06F 3/013 (2013.01)

(58) Field of Classification Search
CPC . G06F 1/163; G06F 3/01; G06F 3/011; G06F 3/013; G02B 27/0025–0068; G02B 27/0093; G02B 27/0172; G02B 27/0176; G02B 27/0179; G02B 2027/011; G02B 2027/0138; G02B 2027/014; G02B 2027/0178; G02B 2027/0181–0187; G06T 5/005; G06T 5/006; G06T 11/003–008; G03B 37/00
See application file for complete search history.

(56) References Cited

U.S. PATENT DOCUMENTS

| | | | |
|---|---|---|---|
| 6,456,339 B1 | 9/2002 | Surati et al. | |
| 2006/0145945 A1 | 7/2006 | Lewis et al. | |
| 2007/0035706 A1 | 2/2007 | Margulis | |
| 2009/0175525 A1* | 7/2009 | Farrer | A61B 3/107 382/131 |
| 2014/0078023 A1* | 3/2014 | Ikeda | G02B 27/0025 345/8 |
| 2016/0091720 A1 | 3/2016 | Stafford et al. | |
| 2016/0353094 A1* | 12/2016 | Rougeaux | G02B 27/0172 |
| 2016/0379373 A1* | 12/2016 | Givon | G06T 7/20 382/103 |

\* cited by examiner

*Primary Examiner* — Nathan Danielsen

(74) *Attorney, Agent, or Firm* — Seed IP Law Group LLP

(57) ABSTRACT

The disclosure relates generally to techniques for using information about a user's actual or predicted pupil location for correcting optical distortions that are specific to an optical lens and display assembly through which the user is viewing one or more images. The described techniques may include identifying and mapping optical distortions specific to an optical lens and display assembly, and using such mapped optical distortions to correct images displayed to a wearer or other user receiving images via the assembly, such as based at least in part on pupil location of the wearer or other user. As one example, the one or more optical lens may be mounted inside a head-mounted display (HMD) that also includes a display panel or other image source for an eye of a wearer, and if so one or more pupil tracking mechanisms may be integrated into the HMD.

28 Claims, 11 Drawing Sheets

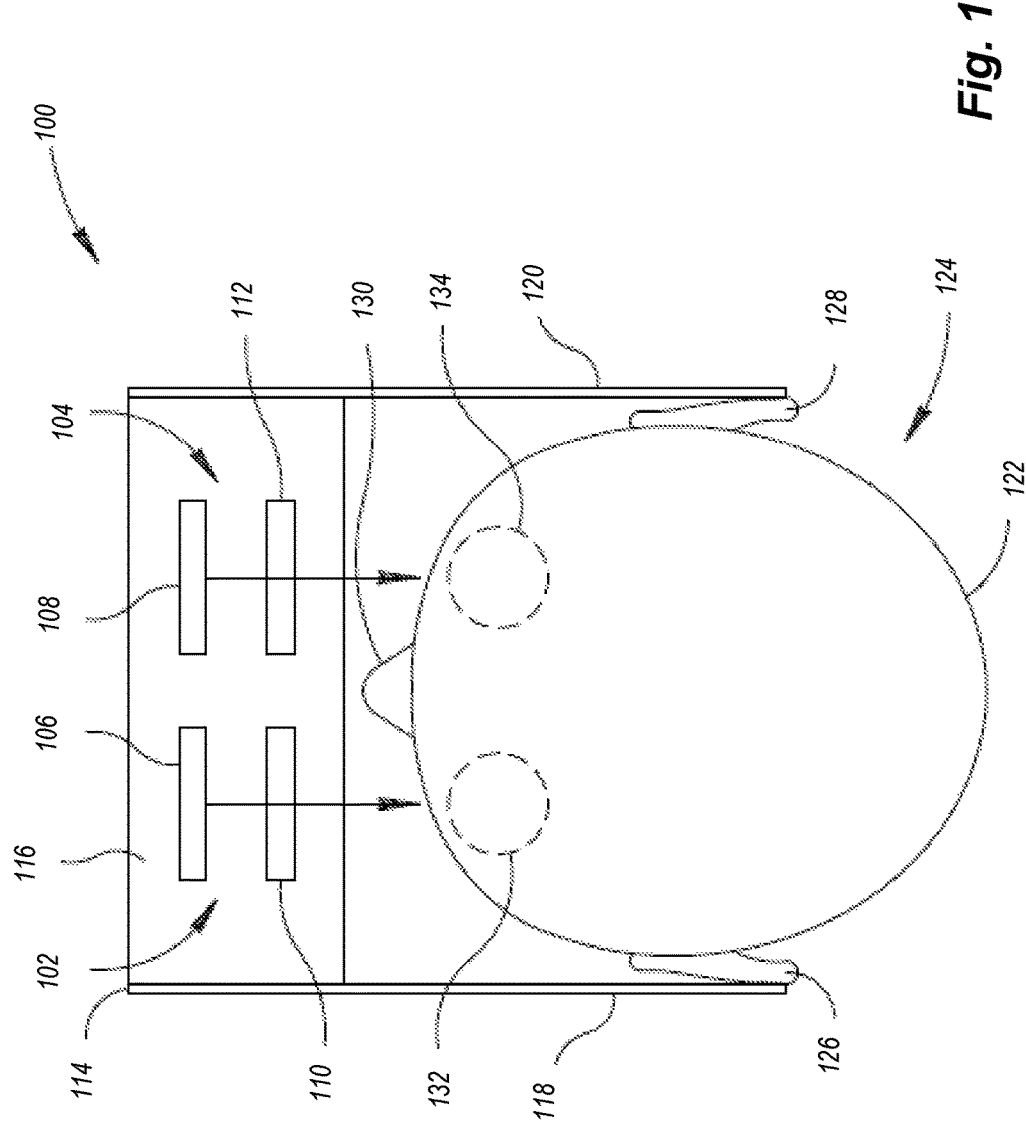

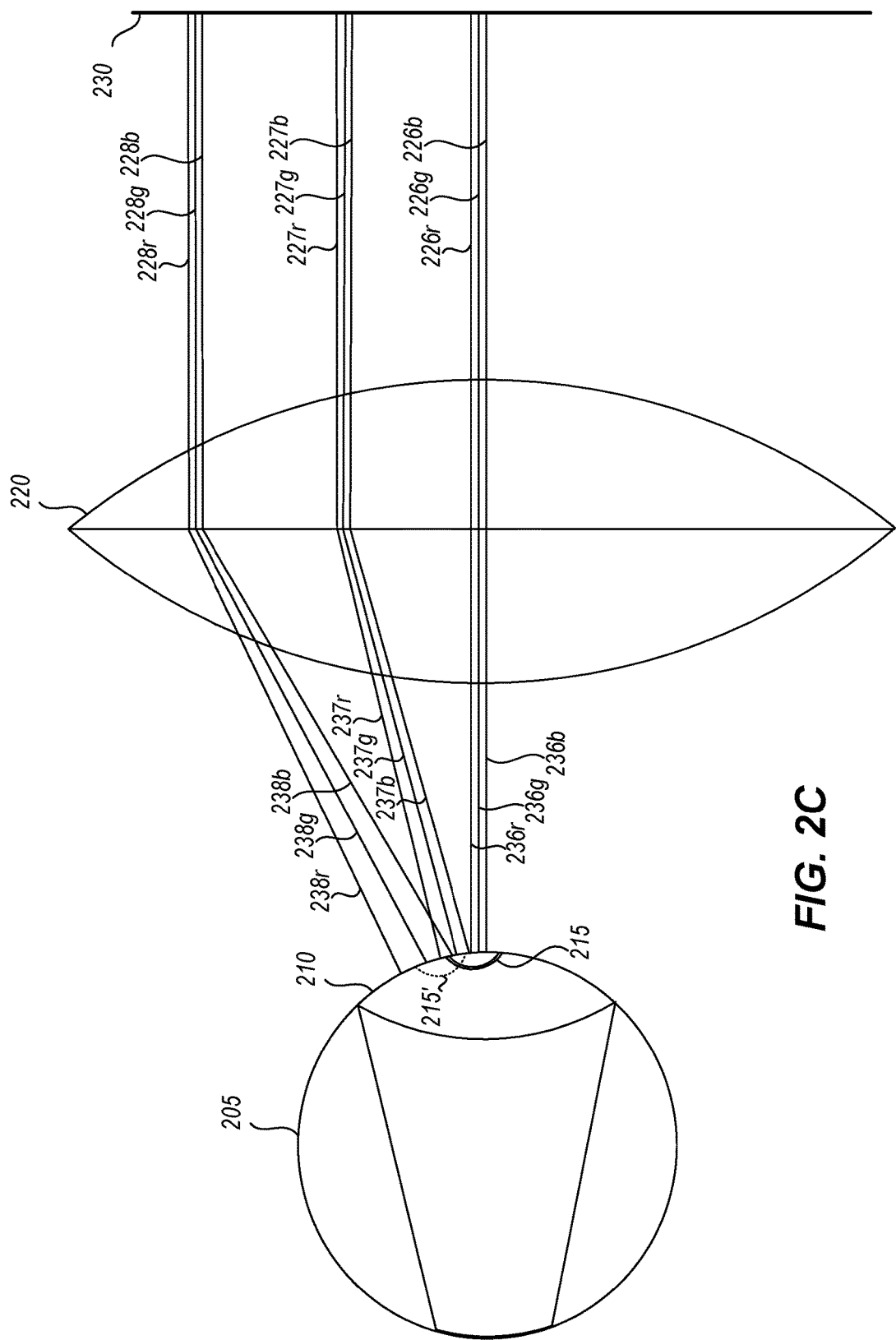

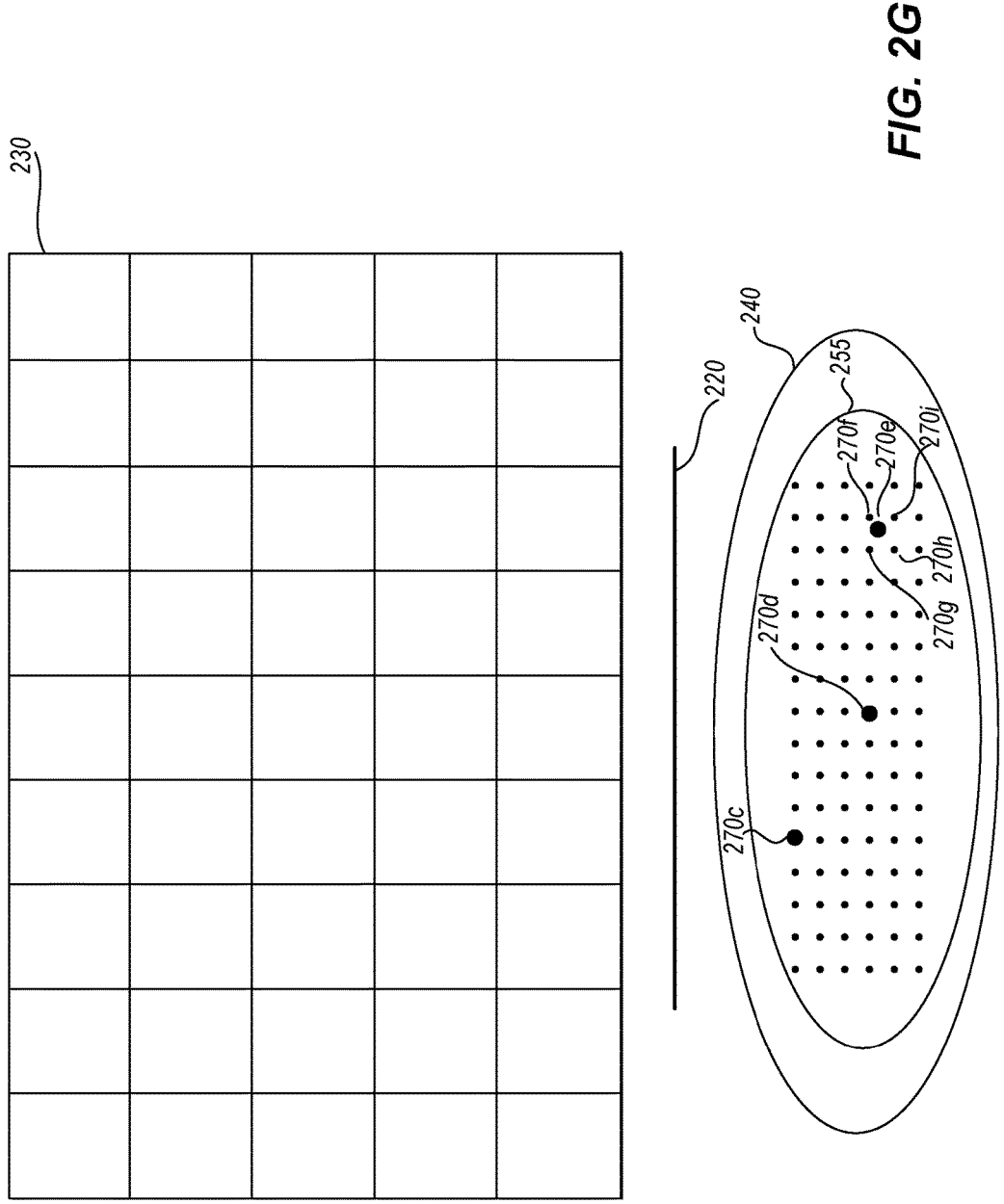

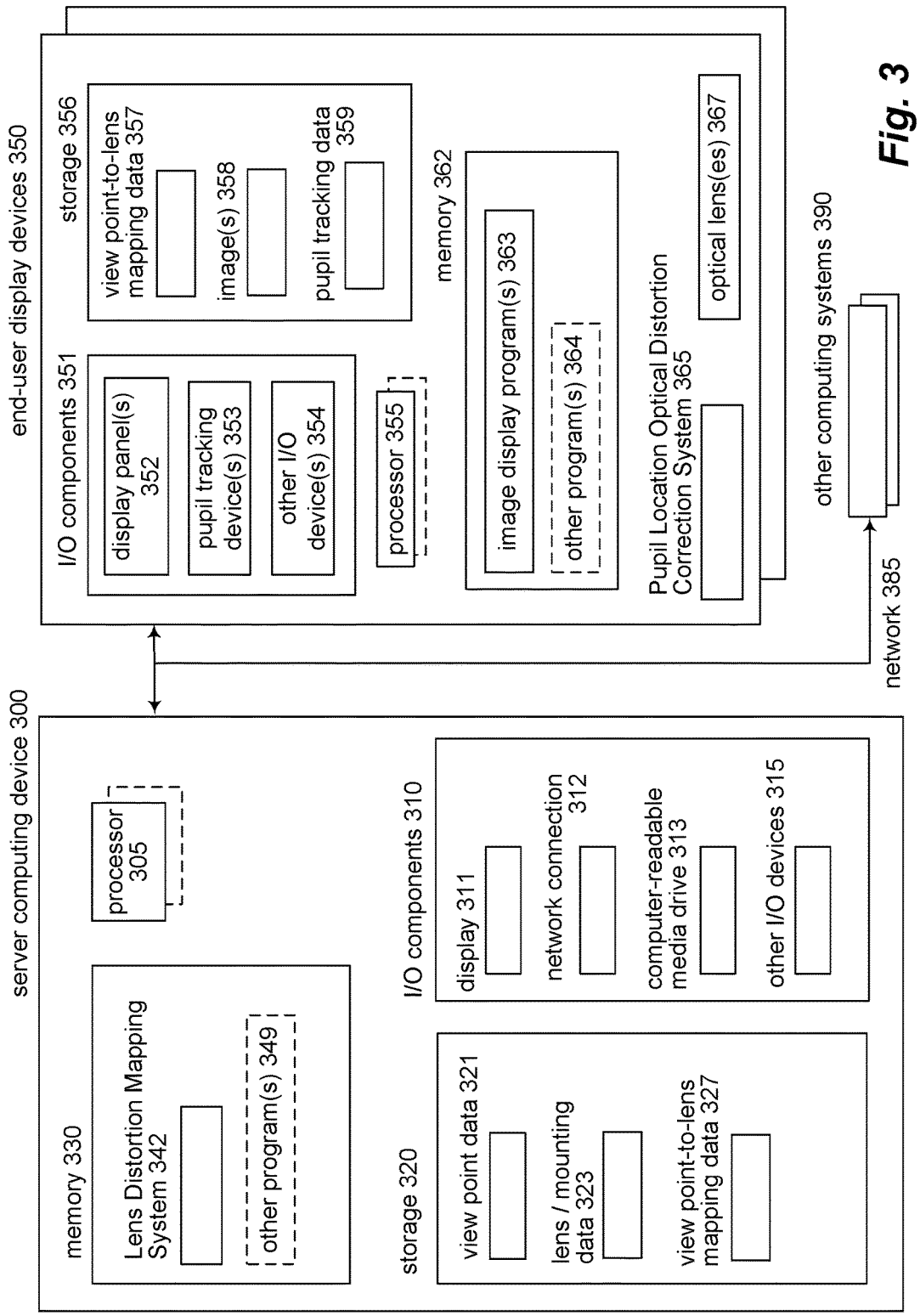

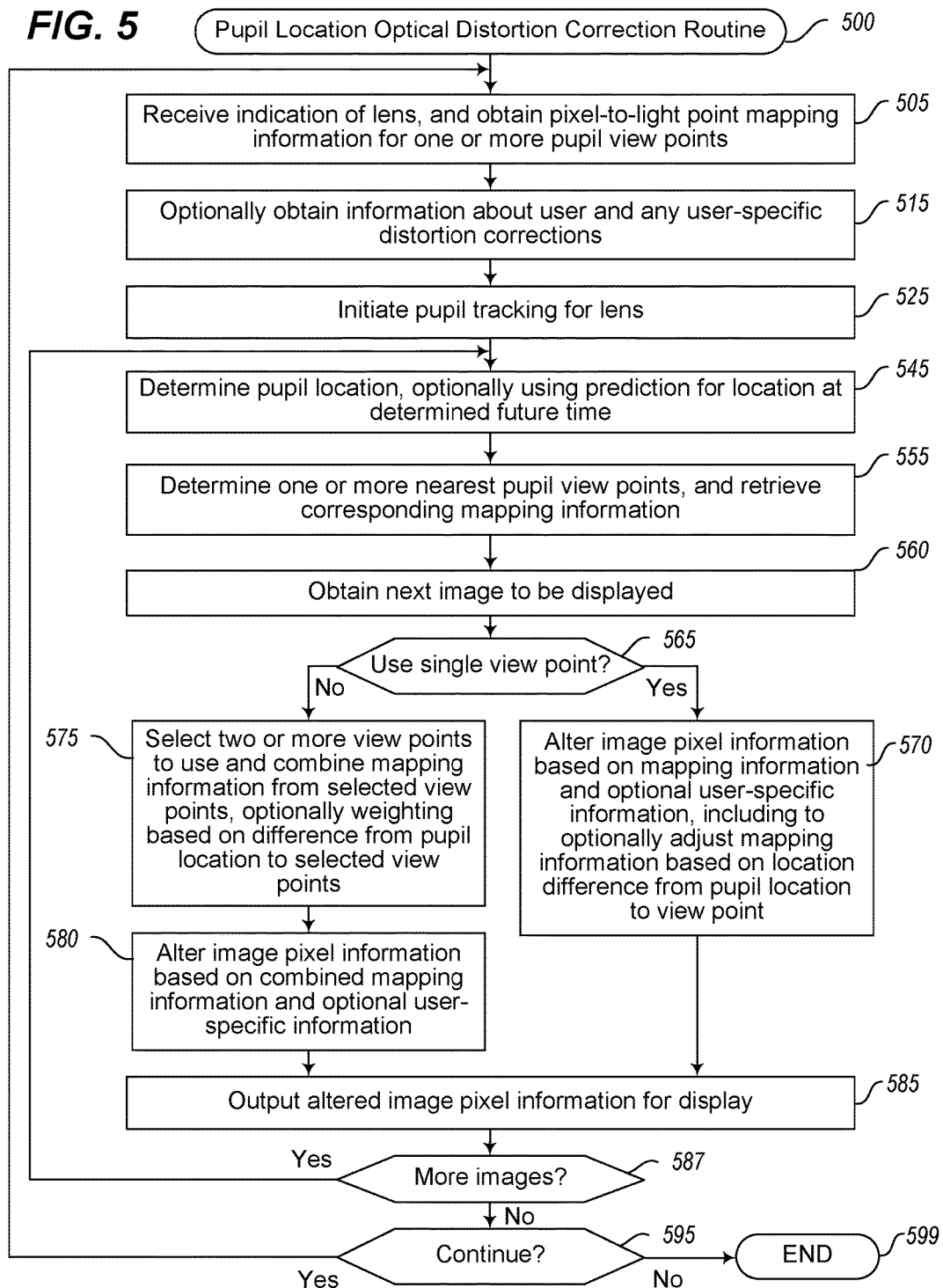

USING PUPIL LOCATION TO CORRECT OPTICAL LENS DISTORTION

TECHNICAL FIELD

The following disclosure relates generally to techniques for using pupil location of a user to correct optical distortions from one or more optical lens being used to view a display panel or other image source, such as for use in a head-mounted display and/or in other devices in which one or more users receive images through one or more optical lens.

BACKGROUND

Demand for displays with heightened performance has increased with the development of smart phones, high-definition televisions, as well as other consumer electronic devices. The growing popularity of virtual reality and augmented reality systems, particularly those using head-mounted displays ("HMDs"), has further increased such demand. Virtual reality systems typically envelop a wearer's eyes completely and substitute a "virtual" reality for the physical reality in front of the wearer, while augmented reality systems typically provide a semi-transparent or transparent overlay of one or more screens in front of a wearer's eyes such that a physical view is augmented with additional information, and mediated reality systems may similarly present information to a viewer that combines real-world elements with virtual elements. In many virtual reality and augmented reality systems, the movement of a wearer of such a head-mounted display may be tracked in various manners, such as via sensors in the head-mounted display and/or external to it, in order to enable the images being shown to reflect user movements.

However, such head-mounted displays, with reduced distance between a viewer's eye and the display and often with a fully obscured field of view, typically have complex performance requirements for optical lens in ways that are difficult to satisfy, let alone to do so at cost-effective levels, and other devices using displays with optical lens may have similar problems. In addition, manufacturing of such head-mounted displays can be difficult and costly, such as due to challenges that include precise manufacturing tolerance requirements and limitations in existing mass production capabilities. Accordingly, needs exist for improved techniques for using optical lens and for manufacturing head-mounted displays and other assemblies of one or more optical lens with additional components, including the need to correct for distortions from the optical lens and to compensate for imperfections in such assemblies.

BRIEF DESCRIPTION OF THE DRAWINGS

FIG. 1 illustrates a top plan view of a head-mounted display system which includes binocular display panels according to an example embodiment of the present disclosure.

FIGS. 2A-2G illustrate examples of use of optical lens, such as for head-mounted displays, in particular manners in particular embodiments in accordance with the described techniques.

FIG. 3 illustrates example computing devices and systems for performing at least some of the described techniques.

FIG. 5 illustrates an example embodiment of a Pupil Location Optical Distortion Correction routine.

DETAILED DESCRIPTION

Figure 2A:
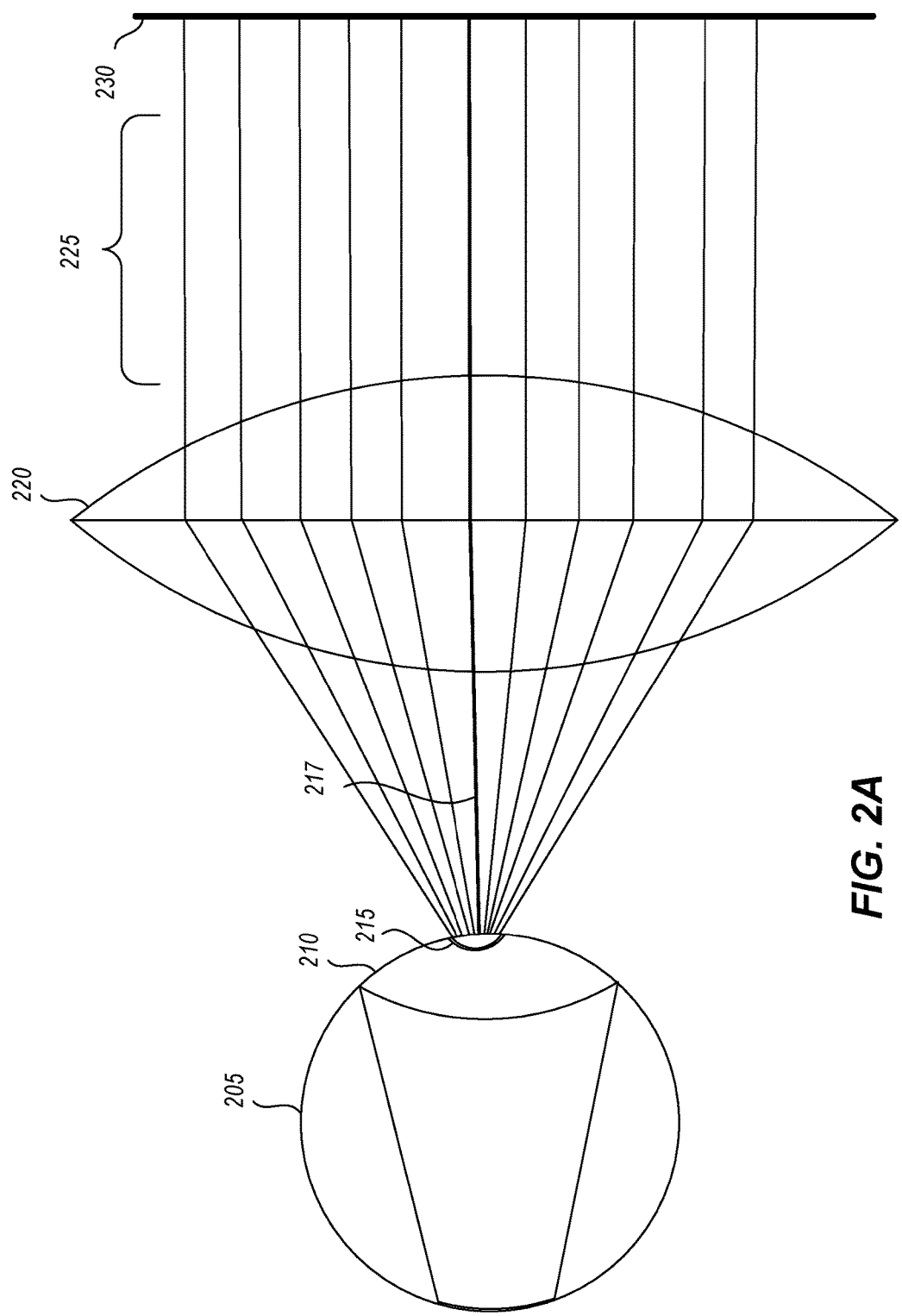

The disclosure relates generally to techniques for using information about a user's eye location and/or movement as part of correcting optical distortions that are caused by or otherwise specific to one or more particular optical lens through which the user is viewing one or more images. In at least some embodiments, pupil tracking techniques are used to determine the pupil location (e.g., in three dimensions) and/or pupil movement of a user who is using one or more optical lens in such a manner. As one example, the one or more optical lens may in some embodiments be mounted inside a head-mounted display (HMD) that also includes a display panel or other image source for an eye of a wearer, and if so the pupil tracking mechanism may be integrated into the HMD, while in other embodiments, the described techniques may be used with other types of display devices, as discussed in greater detail below. If an HMD is in use and includes two separate optical lens that are each used by one eye, each pupil may be tracked separately, in order to enable optical distortion corrections that are specific to the optical lens(es) through which that eye is receiving images—in at least some embodiments, the optical distortion corrections specific to an optical lens are further specific to a head-mounted display or other assembly including the optical lens and one or more other elements (e.g., a display panel, a half-mirrored reflective element between a user's eyes view of the world, etc.), such as to reflect physical layout of the optical lens and other elements and/or to reflect operation of the other elements, and further discussion of optical distortion corrections are to be understood to include such assemblies and other elements in those embodiments. In addition, the use of the terms "lens" herein refers to any optical element that adjusts the path of light, including reflective, refractive and other techniques, and a path of light entering a user's eye may include various elements (e.g., display panel, lens, a half-mirrored reflective element between a user's eyes view of the world, etc.) in various orders and arrangements.

In at least some embodiments, the described techniques include identifying and mapping optical distortions specific to an optical lens, such as after the optical lens is mounted in an HMD or other assembly/device having capabilities to display images that will be viewed by one or more users via the optical lens. Such optical distortions may be of various types, as discussed further below. In addition, the mapping of an optical lens' optical distortions may include positioning an image sensor at each of multiple possible locations for a user's pupil, and identifying specific light-sensitive positions within the image sensor that receive light when one or more corresponding pixels within a display device are activated—such pixels may in some situations provide light of a specific color (e.g., red, green or blue), and are referred to at times as "sub-pixels" that may be grouped together into an aggregate pixel that provides white light when the constituent sub-pixels are all activated. After such pixel-to-pupil position mapping information for a particular pupil location (also referred to at times as a "static distortion mesh" or "volumetric calibration field") is generated, it may be stored in various manners, such as in one or more data structures for later use in adjusting an image to be displayed to a human eye's pupil at that pupil location. Such techniques for identifying and mapping optical distortions specific to an optical lens may further be performed at various times in various embodiments, including at a time of manufacture of the device in which the optical lens is mounted or otherwise attached (e.g., by one or more computing systems operated by the manufacturer), and/or at a time of initial use of the device by a wearer or other user (e.g., by one or more hardware processors that are part of or in communication with the device, such as one or more GPUs, or graphical processing units, and/or one or more CPUs, or central processing units). In other embodiments, the generation of such mapping information may be performed in part or in whole without using such a display panel and/or image sensor, such as by instead modeling the optical lens and simulating the optical effects at different pupil locations as noted above. In yet other embodiments, some or all of the initial mapping information is generated in manner discussed above using a display panel and image sensor, but modeling and simulating may be used to modify such initial mapping information in one or more manners (e.g., in a user-specific manner, such as to address distortions specific to an eye of the user and/or glasses or contacts worn by the user based on a prescription or other information that provides corresponding information). Additional details related to such techniques for identifying and mapping optical distortions specific to an optical lens are included below, and such techniques may be performed via automated operations of a lens distortion mapping system in at least some embodiments, as discussed in greater detail below.

In at least some embodiments, the described techniques include using mapped optical distortions specific to an optical lens to correct images displayed to a wearer or other user receiving images via the optical lens, such as based at least in part on pupil location of the wearer or other user. Such techniques for using mapped optical distortions specific to an optical lens to correct images displayed via the optical lens may include determining a wearer or other user's pupil location (e.g., via pupil tracking capabilities integrated into the device containing the optical lens, or instead in an associated external device) for use in displaying an image, such as an actual current pupil location and/or a predicted future pupil location at a future time (e.g., at a defined number of future milliseconds) at which the image will be displayed. One or more of the predefined pupil locations for which mapping information is available may then be determined, such as to select one or more nearest predefined pupil locations (e.g., four predefined pupil locations surrounding the determined pupil location), and the mapping information for the selected predefined pupil location(s) may then be used to adjust the image to be displayed, such as to alter which pixels on the display device are illuminated so that positions within the determined pupil location receive light corresponding to the image before the adjustment, in order to correct the optical distortions for the optical lens. Such techniques for using mapped optical distortions specific to an optical lens to correct images displayed via the optical lens may be performed for various types of devices in which such optical lens are used, such as an HMD, camera, telescope, binoculars, etc., whether by one or more processors that are integrated in such devices or instead are located in one or more external computing systems that assist in display capabilities for the devices. Additional details related to such techniques for using mapped optical distortions specific to an optical lens to correct images displayed via the optical lens are included below, and such techniques may be performed via automated operations of a pupil location optical distortion correction system in at least some embodiments, as discussed in greater detail below.

For illustrative purposes, some embodiments are described below in which various specific details are included for illustrative purposes, and in some cases some embodiments are simplified for the sake of brevity so as to not illustrate well-known components. For example, in some embodiments discussed below, particular types of display panels are used in particular manners with particular types of optical lens (e.g., as part of a head-mounted display for virtual reality and/or augmented reality), including to use particular types of techniques as part of controlling display operations for the display panel to reduce or eliminate optical distortion from the lens, such as based at least in part on tracking pupil location and pupil movement of a user in particular manners. However, it will be appreciated that the inventive techniques may be used in a wide variety of other situations, including with other types of display devices and/or other types of determination of a user's pupil location or other gaze direction, some of which are discussed below.

FIG. 1 is a simplified top plan view of an HMD system 100 that includes a pair of near-to-eye display systems 102 and 104. The near-to-eye display systems 102 and 104 include displays 106 and 108, respectively (e.g., OLED micro-displays), and respective optical lens systems 110 and 112 that each have one or more optical lenses. The display systems 102 and 104 may be mounted to frame 114 which includes a front portion 116, a left temple 118 and right temple 120. The two display systems 102 and 104 may be secured to the frame 114 in an eye glasses arrangement which can be worn on the head 122 of a wearer user 124. The left temple 118 and right temple 120 may rest over the user's ears 126 and 128, respectively, while a nose assembly (not shown) may rest over the user's nose 130. The frame 114 may be shaped and sized to position each of the two optical systems 110 and 112 in front of one of the user's eyes 132 and 134, respectively. Although the frame 114 is shown in a simplified manner similar to eyeglasses for explanatory purposes, it should be appreciated that in practice more sophisticated structures (e.g., goggles, integrated headband, helmet, straps, etc.) may be used to support and position the displays systems 102 and 104 on the head 122 of user 124.

The HMD system 100 of FIG. 1 is capable of presenting a virtual reality display to the user 124, such as via corresponding video presented at a display rate such as 30 frames (or images) per second or 90 frames per second, while other embodiments of a similar system may present an augmented reality display to the user 124. Each of the displays 106 and 108 may generate light which is transmitted through and focused by the respective optical systems 110 and 112 onto the eyes 132 and 134, respectively, of the user 124. While not illustrated here, each of the eyes will typically include a pupil aperture through which light passes into the eye, with a typical pupil size ranging from 2 mm (millimeters) in diameter in very bright conditions to as much as 8 mm in dark conditions, while the larger iris in which the pupil is contained may have a size of approximately 12 mm the pupil (and enclosing iris) may typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 124 as images and/or video. In some implementations, the distance between each of the optical systems 110 and 112 and the user's eyes 132 and 134 may be relatively short (e.g., less than 30 mm, less than 20 mm), which advantageously causes the HMD system 100 to appear lighter to the user since the weight of the optical systems and the display systems are relatively close to the user's face, and also may provide the user with a greater field of view. While not illustrated here, some embodiments of such an HMD may include various additional internal and/or external sensors, such as to perform pupil tracking separately for each eye 132 and 134, to track head location and orientation (e.g., as part of head tracking), to track various other types of movements and position of the user's body, cameras to record external images (e.g., of an environment), etc.

While the described techniques may be used in some embodiments with a display system similar to that illustrated in FIG. 1, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. One non-limiting example of a display panel with which some embodiments of the described techniques may be used is discussed in further detail in U.S. application Ser. No. 15/059,171, filed Mar. 2, 2016 and entitled "Display With Stacked Emission And Control Logic Layers," which is hereby incorporated in its entirety. In other embodiments, the user may view one or more images through one or more optical lens that are produced in manners other than via a display panel, such as on a surface that reflects light from another light source in part or in whole.

As noted above, various types of optical distortions may be caused by different types of lens and different types of optical effects, and may be corrected via use of the described techniques. For example, FIGS. 2A-2G illustrate examples of use of optical lenses, such as for head-mounted displays, in particular manners in particular embodiments in accordance with the described techniques. With respect to FIG. 2A, a human user's eye 205 is illustrated, with an iris section 210 that includes a pupil 215. In addition, FIG. 2A includes an example display panel 230 (shown from a side view), with an optical lens 220 (also shown from the side) situated between the eye 205 and the display panel 230. As the display panel 230 illustrates various light rays 225 from pixels (not shown) of the display panel 230, the light travels outward and into the lens 220. In an ideal situation, the lens 220 bends the light rays 225 from different portions of the display panel 230 so that the respective light rays emerging from the optical lens 220 are entering the pupil 215 at corresponding locations, so as to form the image displayed on the display panel 230 on the pupil and inner portions of the eye. With respect to light entering a central axis 217 of the optical lens 220 (with respect to both horizontal and vertical axes, although only the vertical axis is visible in this side view), and if the pupil 215 is similarly aligned with that central axis, the lens 220 may perform little or no bending of the light rays emerging from the display panel 230. It will be appreciated that the optical lens 220 and display panel 230 are illustrated from the side, and light rays may be emitted from the display panel in not only a vertical manner as is illustrated but also in a horizontal manner (or depth with respect to this side view) that is not illustrated in this example. Furthermore, while the light rays 225 are illustrated as leaving the display panel 230 is purely a straight line for the purpose of this example, it will be appreciated that some or all pixels of the display panel emit light in multiple directions (or with at least some variation from being purely orthogonal to the surface of the display panel), even if focused by per-pixel lenses (not shown).

Figure 2B:
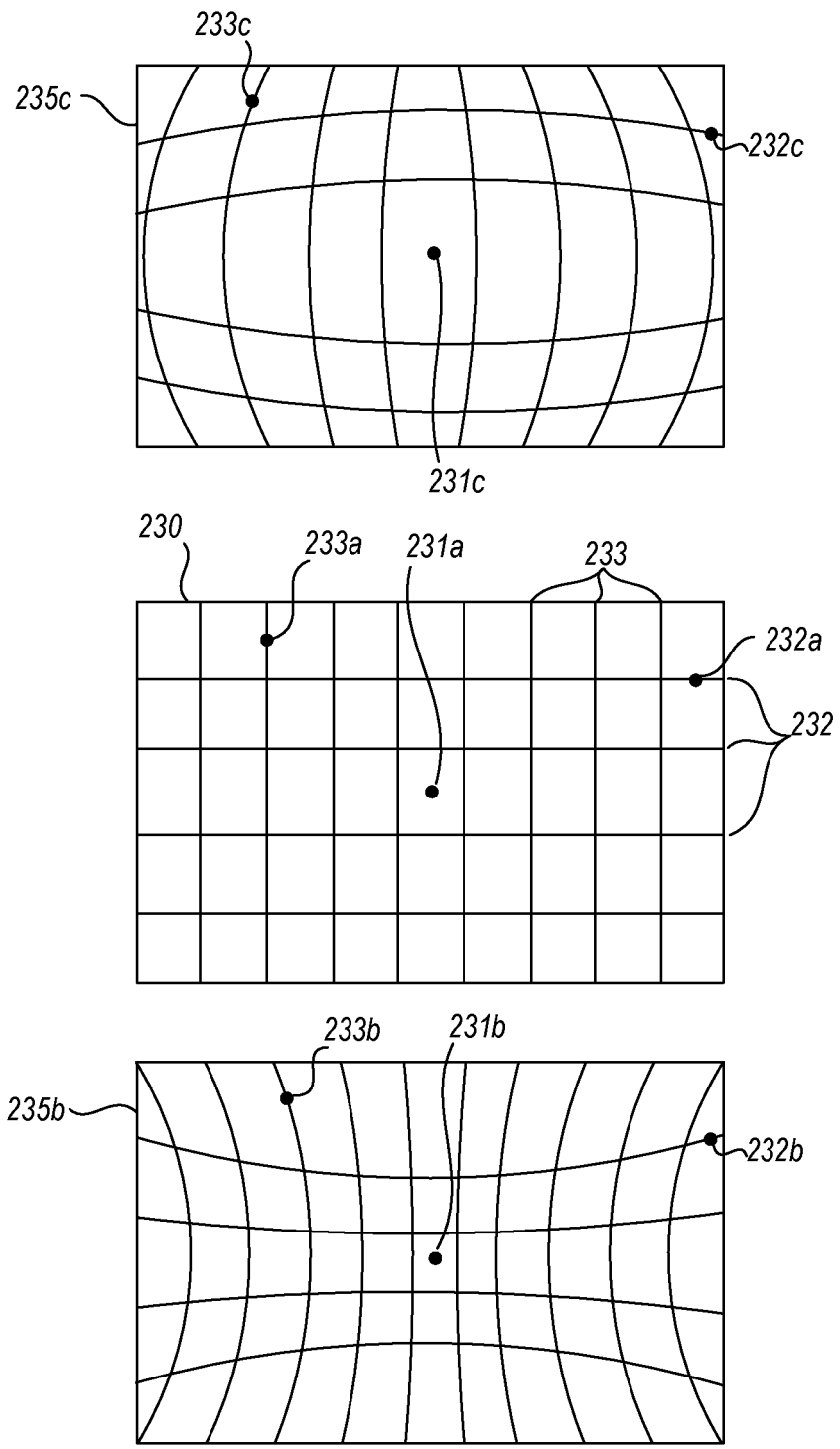

FIG. 2B illustrates a further example of information that may be displayed on the display panel 230, which in the illustrated example is a test image with straight horizontal and vertical lines 232 and 233, respectively. A point 231a corresponding to the central axis 217 is illustrated, as are other example points 232a and 233a that correspond to other points that are off the central axis. In addition to the image shown for display panel 230, two alternative other resulting images 235b and 235c are illustrated that show two types of possible optical distortions that may be caused on a viewer's pupil by light passing through one or more optical lenses. With respect to resulting image 235b, it illustrates an example of an optical distortion phenomenon referred to as pincushion distortion, in which image magnification increases with the distance from the central optical axis 217, causing a visible effect in which lines are bowed inward, the farther from the central axis that they occur. Conversely, visual representation 235c illustrates a different type of optical distortion referred to as barrel distortion, in which image magnification decreases with distance from the central optical axis, such that lines are increasingly bowed outwards as they progress farther from the central optical axis. It will be appreciated that such optical distortion effects may occur in an optical lens even if it does not include errors or other distortions that are specific to that lens, such as based on the amount of curvature of the lens relative to a distance on which the image is being focused. In addition, a particular lens may, in some cases, include combinations of both pincushion and barrel distortion, sometimes referred to as mustache distortion, in which it begins as barrel distortion close to the central optical axis and gradually turns into pincushion distortion towards the periphery of the image.

FIG. 2C illustrates an example of another type of optical distortion phenomenon, referred to as chromatic aberration, which is caused in part by the different degrees of refraction of different color light rays when passing through a curved optical lens. In particular, it will be appreciated that a display panel 230 such as that illustrated in FIGS. 2A-2C may include pixels of different colors, such as common use of red, green, and blue pixels in various combinations in an RGB display. In situations in which a set of red, green and blue pixels are located along the central optical axis 217, the light emitted from them (such as in this example being shown as 226r, 226g and 226b for red, green and blue pixels, respectively) may pass through an optical lens along that central axis with little or no bending of the different light rays, as reflected in the resulting light rays 236r, 236g and 236b, respectively. Such light whose rays are parallel are referred to at times as collimated light. Conversely, the farther the light rays are located from the central optical axis when they pass through the optical lens 220, with a greater degree of curvature of the optical lens at those locations, the greater the variation in the amount of refraction between different light rays. Thus, with respect to example light rays 227r, 227g and 227b emitted from respective red, green and blue pixels at an area approximately one third of the distance from the central optical axis to the top of the display panel 230, the resulting light rays 237r, 237g and 237b are increasingly separated as they leave the optical lens 220 and approach the eye 205. Similarly, for light rays 228r, 228g and 228b that are emitted near the top of the display panel 230, the respective light rays 238r, 238g and 238b that are emitted from the optical lens 220 have even greater divergence, resulting in this example with two of the three light rays 238 not even being received by the pupil 215. It will be appreciated that such chromatic aberration effects may occur even if an optical lens does not include any errors or distortions specific to the lens, such as based on the degree of curvature and the respective properties of different colors of light. In addition, FIG. 2C further illustrates an alternative pupil position 215'—as is shown, light from a single pixel (e.g., light ray 237g) will enter the pupil at different angles as the pupil moves within the eyebox. Moreover, this effect may vary over the visual field, making certain objects or other elements being displayed appear to shift, stretch and/or compress as the pupil moves, thus seeming wobbly or "swimmy" and contributing to motion sickness if not corrected. Furthermore, while FIGS. 2B and 2C provide examples of some types of optical distortion phenomenon, various other types of optical distortions may occur in particular situations, as well as problems caused by manufacturing defects, misalignments (e.g., between an optical lens and associated display panel), etc., and some or all of these may corrected in whole or in part by the inventive techniques described herein.

Figure 2D:
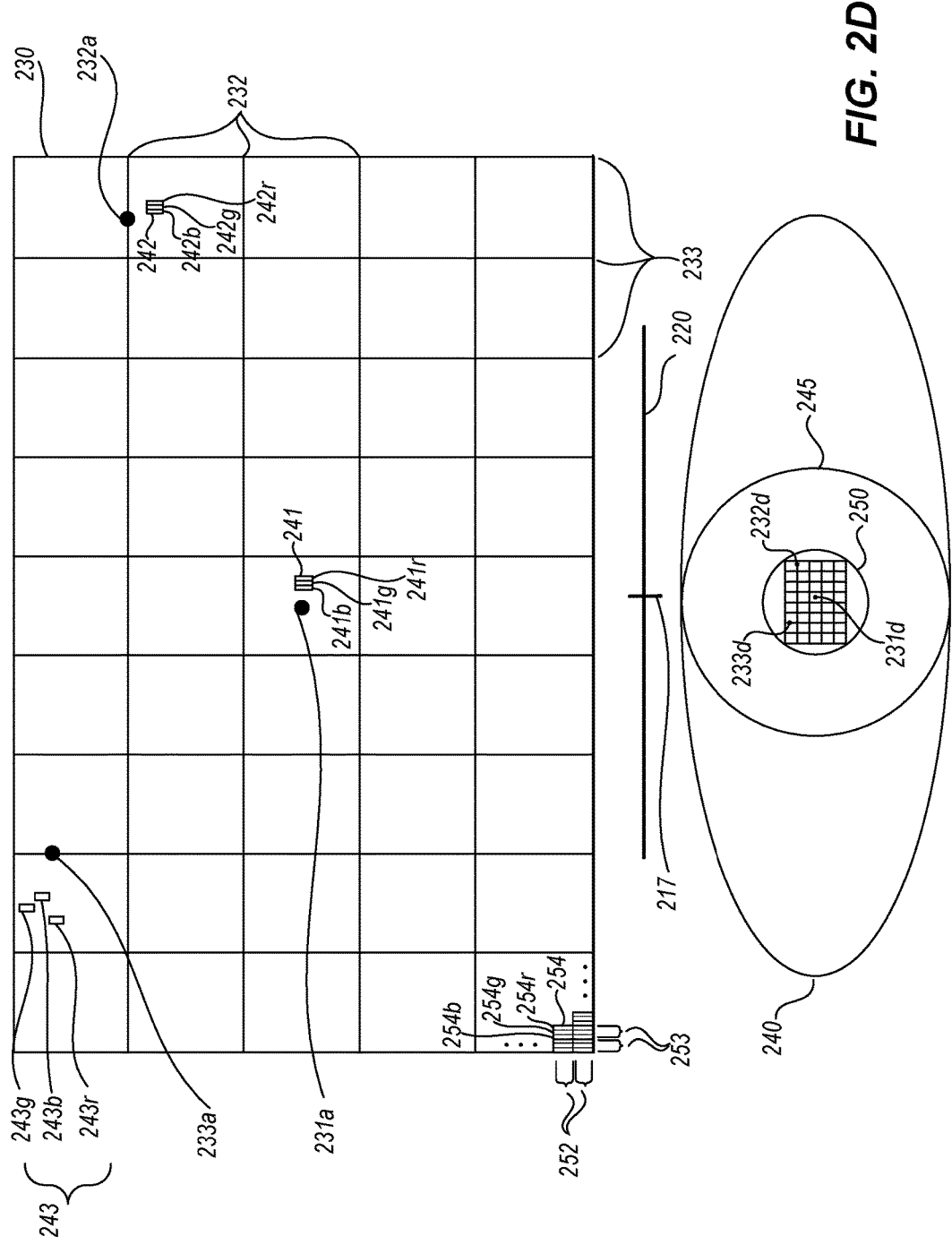

FIG. 2D continues the examples with respect to FIGS. 2A-2C, and illustrates a specific example of how an example optical lens 220 (shown as a single line without width for the purposes of illustration) may distort an image being emitted by the display panel 230, which in this example again illustrates the same example test pattern with straight horizontal and vertical lines 232 and 233, respectively, as previously illustrated in FIG. 2B. In this example, a portion 240 of an eye that is visible under open eyelids (not shown) is illustrated, with an example iris 245 and pupil 250. In an ideal situation, a visual representation of the image from the display panel 230 will be projected onto the pupil via the lens 220, including having the horizontal and vertical lines 232 and 233 of the display panel 230 being shown in the same manner and in the same relative locations within the pupil 250 as is illustrated.

However, due to errors specific to the particular lens 220, as well as other optical distortion effects as discussed previously and elsewhere herein (e.g., imperfect alignment and other manufacturing defects), the actual locations on the display panel that are projected to the respective portions of the pupil may not be perfectly aligned in the illustrated manner. For example, a center point 231a of the display panel 230 in this example may correspond to an aggregate or combination pixel with multiple sub-pixels (e.g., that each emits one of red, green and blue light). However, even if the pupil is directed along the central axis 217 and is looking straight at the center point 231a (such that a center of the pupil is aligned with the central axis), distortions in the optical lens 220 may still cause at least a slight shifting of light, such that the light that appears in the center point 231d within the pupil actually corresponds to and is emitted from combination pixel 241 to the right of the actual center point 231a. In this example, combination pixel 241 is offset from the central location 231a in only the horizontal direction, but it will be appreciated that such an offset may occur in the horizontal and/or vertical directions. In a similar manner, the display point 232a in the upper right of the display panel may be offset from the actual pixels in the display panel whose light reaches that corresponding point 232d within the pupil, such as, in this example, to have a combination pixel 242 that is offset from the actual point 232a in both the horizontal and vertical directions. Similarly, with respect to point 233a in the upper left portion of the display panel, in this example, the optical distortions of the lens 220 may cause different sub-pixels at different locations to correspond to a single point 233d in the visual representation in the pupil, such as to have a red sub-pixel 243r in one location, a blue sub-pixel 243b in a different location, and a green sub-pixel 243g in a third location, with those three different sub-pixels in effect acting as an aggregate combination pixel 243 with respect to the actual point 233d in the visual representation within the pupil. It will be appreciated that while a single red, green and blue sub-pixel is shown in this example corresponding to each of the viewpoints 231a, 232a and 233a, that various combinations of pixels in various locations may together provide light rays that converge on a particular point in a visual representation within a pupil in particular situations. In addition, while an optical lens may actually cause the visual representation passing through the pupil to the retina to be flipped with respect to the horizontal and/or vertical axes relative to the image displayed on the display panel 230, the pupil's visual representation is illustrated in these examples without such changes for the sake of simplicity.

In order to address the optical distortions that are specific to this particular optical lens 220, the described techniques include performing operations in at least some embodiments to map the various pixels of the display panel 230 with respect to their actual effect through the optical lens 220 on a representative pupil located at a position in which the actual human eye pupil will receive the light from such a display panel. In particular, in this example the display panel is composed of a large numbers of rows 252 and columns 253 of pixels, with each such combination pixel in this example including red, green and blue sub-pixels. Thus, for example, with respect to example pixel 254, it includes sub-pixels 254b (a blue sub-pixel), 254g (a green sub-pixel) and 254r (a red sub-pixel). In some such embodiments, the mapping operation includes selecting combinations of one or more sub-pixels and successively illuminating each such group, and determining one or more corresponding positions within the pupil 250 that receive light from that group of one or more pixels. For example, an image sensor (not shown) may be instead placed at the location at which the pupil would otherwise be located along the central axis 217, and particular light-sensitive positions within the image sensor (e.g., positions from an array of such light-sensitive positions within the image sensor) may be determined as receiving incoming light rays from that group of pixels. By progressively moving through some or all pixels in the display panel, such as by illuminating (or activating) each individual sub-pixel or combination pixel separately in some such embodiments, corresponding location points within the visual representation of the pupil (as represented by the image sensor) may be determined for the illuminated pixels and that central axis pupil location. The resulting information may then be used to map particular pixels to particular positions within the pupil for that central axis pupil location and that optical lens, such as to provide the information discussed above with respect to the actual effects of pixels 241, 242 and 243 with respect to the corresponding locations 231a, 232a and 233a within the display panel.

After such a pixel-to-pupil position mapping is created for a display panel and a particular optical lens to be used with it, the resulting mapping information may be used to adjust the image that is actually displayed on the display panel, in order to control how the resulting visual representation on the pupil 250 occurs. For example, if an image has a white pixel at location 233a of the display panel, the actual pixel(s) that are activated to have the corresponding image occur at the location 233d of the pupil 250 may need to be changed to the aggregate combination pixel 243 as discussed—thus, an automated processing routine may alter the information for the display panel buffer (or the image itself) so that the actual one or more pixels at location 233a may be turned off, while the illustrated sub-pixels for aggregate combination pixel 243 may be illuminated to cause that white point to be shown at location 233d of the visual representation within the pupil. It will be appreciated that such a determination may be made for each pixel on the display panel, in order to determine zero or more alternative actual pixels to illuminate to cause the original pixel to be shown at the correct location in the visual representation within the pupil. In this manner, a human user that is using this optical lens 220 and display panel 230 may receive the displayed visual representation of straight horizontal and vertical lines 232 and 233 on the visual representation in the pupil, even if the actual pixels illuminated on the display panel 230 do not display such a representation in the absence of the optical lens.

It will be appreciated that if multiple optical lenses of a specified type could be generated so that they are substantially identical and without any lens-specific errors or other distortions, such a predefined mapping of one or more pupil locations to particular display panel pixels may be performed only a single time for a lens of that type, if the relative location of different such optical lenses may be specified with sufficient accuracy relative to eye location and display panel location.

Figure 2E:
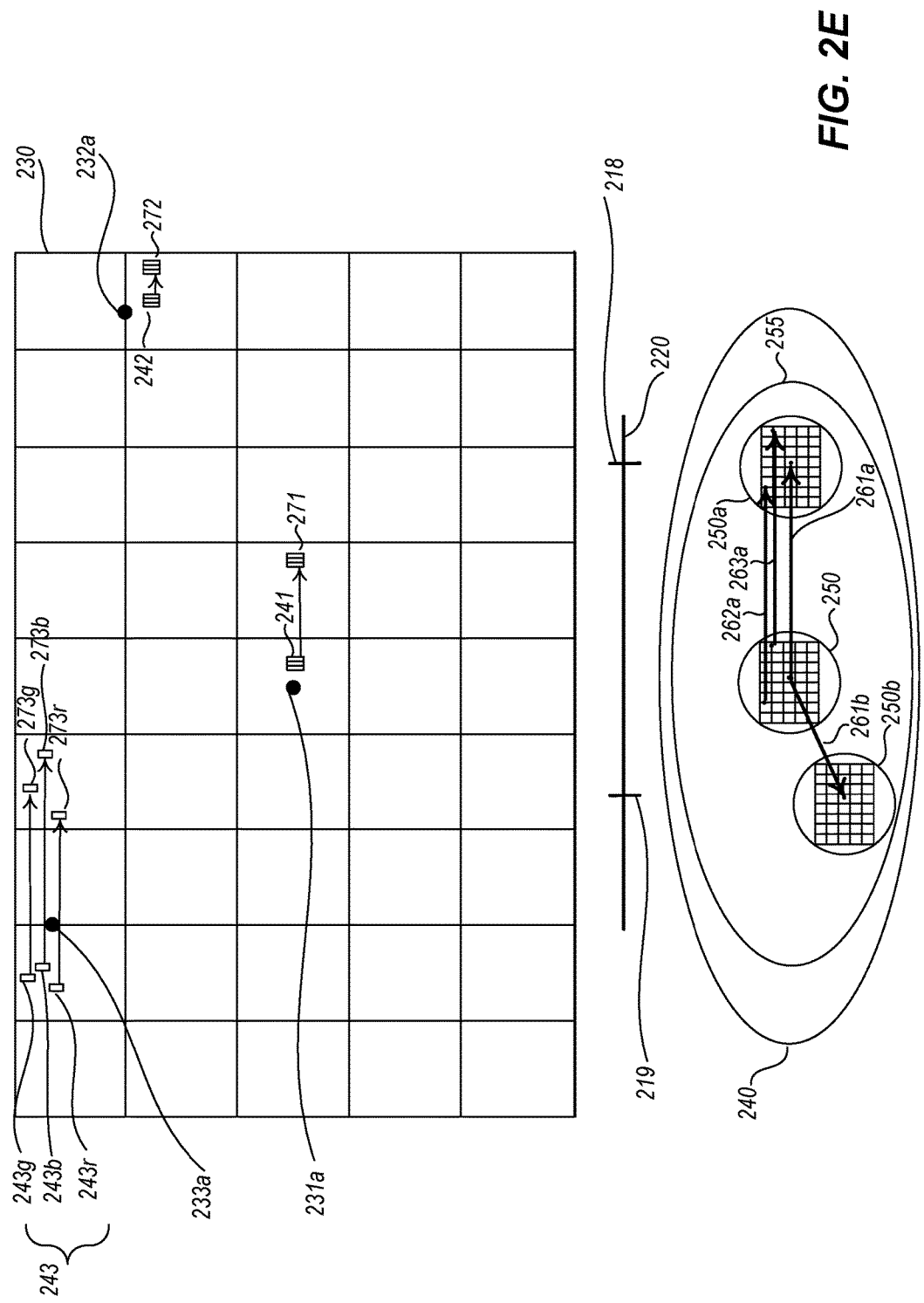

FIG. 2E continues the examples discussed with respect to FIGS. 2A-2D, and in particular extends the technique discussed with respect to FIG. 2D to situations in which the pupil moves within the visual portion 240 of the eye away from the central optical axis of the lens. In particular, a pupil of a typical user may range within an area illustrated as 255 in this example, and referred to at times as the "pupil box" (although the area 255 may have a shape other than rectangular, as is shown). If the pupil moves away from the central optical axis and the resulting image displayed on the display panel 230 is not adjusted, changes in various optical distortions may occur, including those previously discussed, as well as additional optical distortions that can occur if the pupil location movement is accompanied by other physical movement of the user (e.g., the user's head) and the resulting images do not adapt quickly enough to pupil movement and other user movement.

In this example, the iris is not illustrated, with the example pupil 250 of FIG. 2D again illustrated in the center of the eye portion 240 (corresponding to the central axis 217), but with alternative pupil locations 250a and 250b also shown. For example, if a user moves their pupil laterally to the left (shown here as moving to the right from the standpoint of an observer looking at the person's eye), the pupil at location 250a will now correspond at a location 218 in the optical lens 220 that is significantly off the central axis 217 of the lens (not shown in FIG. 2B) in the horizontal direction. Accordingly, if the example pixels 241, 242 and aggregate pixel 243 of FIG. 2D are again illuminated to correspond to the viewpoints 231a, 232a and 233a, the optical distortions caused by the lens 220 at the location 218 will cause a resulting image in the pupil at location 250a that differs significantly from that of the pupil 250 at its central axis location. As discussed in greater detail elsewhere herein, pupil tracking may be performed in various manners. As one example, if the lens 220 and display panel 230 are part of a head-mounted display, such as for one of the two eyes of a user wearing the HMD, the HMD may include internal cameras or other sensors to perform pupil location tracking for each eye.

Instead, as one example of how such pupil movement may be handled, the described techniques may be in some embodiments alter the actual pixels that are displayed in the display panel in a manner that corresponds to the movement of the pupil location relative to its central axis location 250. With respect to the example of the pupil at location 250a, the described techniques in this illustrated example may include performing a lateral horizontal translation of the pixels that are actually illuminated in the display panel, so as to provide, if possible, a lateral translation of the image from the display panel so that the same image as would have occurred in FIG. 2D at the central axis location is now displayed at the pupil location 250a with the translated pixels, as illustrated with respect to lateral translation arrows 262a, 263a and 261a corresponding to view locations 233a, 232a and 231a on the display panel and corresponding positions 231d, 232d and 233d (not shown) in the pupil. Thus, the described techniques may perform calculations to determine new pixels to display to illustrate those points 233a, 232a and 231a for the new pupil location 250a, such as to perform in this example a lateral translation of each of the sub-pixels being used to a new location. For example, with respect to pixel 241 that was previously used to display the point at view location 231a, a lateral translation of a defined amount may be used to select a new pixel 271 that will instead be displayed to cause the point at the view location 231a to occur in the center of the pupil at the pupil location 250a, and new pixel 272 may similarly be used to represent the previous pixel 242 to illuminate the viewpoint 232a at the new pupil location 250a. It will be appreciated that different locations may have different amounts of horizontal translation, such as in this example to translate the pixel 242 near the right edge of the display only a small amount, while the pixel 241 near the center of the display is translated by a larger amount, and the combination aggregate pixel 243 near the left edge of the image display is translated by an even greater amount, with the new pixels for the aggregate pixel to replace pixel 243 being shown by sub-pixels 273g, 273b and 273r. In addition, it will be appreciated that even if the pupil moves in only a lateral manner along a horizontal axis as is shown from location 250 to 250a, the resulting translation of pixels to use in the display panel may occur in a manner other than purely horizontal as is illustrated in this example.

In addition, alternative pupil location 250b indicates a different example in which the pupil location is moved a smaller amount, but in both a horizontal and vertical direction to axis 219 within the optical lens, such as is reflected by example translation 261b corresponding to the central point 231a being moved to the new pupil location 250b. While corresponding pixels in the display panel are not illustrated in this example for pupil location 250b, it will be appreciated that a similar translation may be performed to select new pixels for use in providing the same visual representation at the new pupil location 250b, such as by interpolating and/or extrapolating the new position of each pixel based on an amount of movement of the pixel relative to a total amount of possible movement (e.g., if the pupil location 250a corresponded to 75% of the possible movement to the left within the pupil location area 255, each of the pixels in the display panel may be moved 75% of the possible amount from that pixel to the edge of the display panel in that horizontal direction). In addition, while only single pixels continue to be used to represent a corresponding point in the display panel, it will be appreciated that in some embodiments and situations, multiple pixels at one or more locations may be used to represent a single viewpoint in the display panel, depending on pupil location and optical distortion specific to the particular lens 220 in use (e.g., in combination with its assembled alignment with the particular display 230).

Figure 2F:
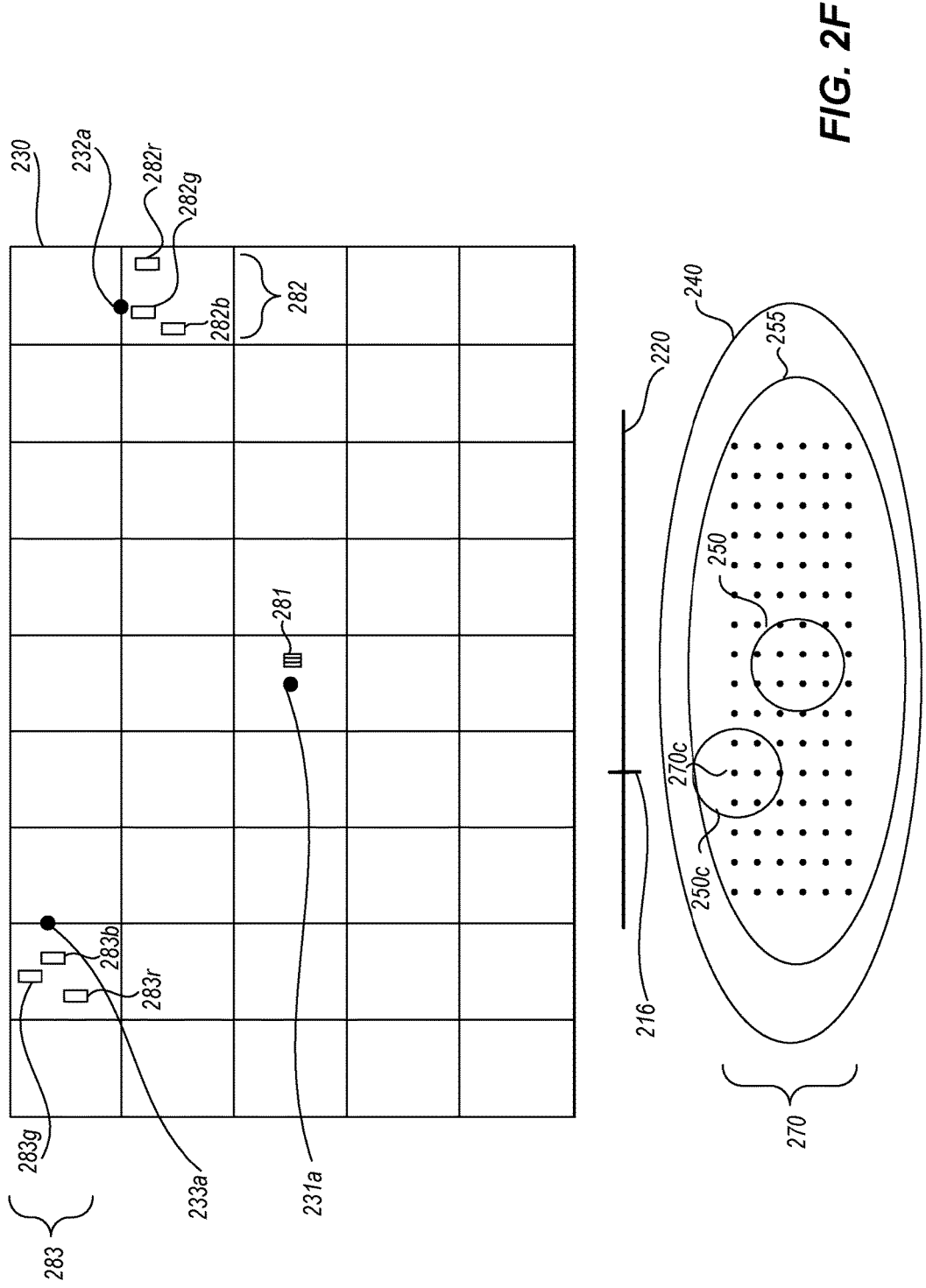

FIG. 2F continues the examples of FIGS. 2A-2E, and illustrates further use of the described techniques to manage situations in which a pupil location of a user is mapped and then used for locations other than on a central axis for an optical lens. In particular, in the example of FIG. 2F, the same optical lens 220 is again illustrated, along with eye portion 240 and pupil box movement area 255 in which the pupil may move. As discussed in greater detail with respect to FIG. 2D, in some embodiments the described techniques include generating a mapping from display panel pixel locations to corresponding points within a pupil through a specific optical lens 220 when the pupil is located along the central optical axis of the optical lens 220. FIG. 2F illustrates an extension of that technique in which such a corresponding mapping of display panel pixel locations to corresponding visual representation points within a pupil location is performed for each of a number of defined positions 270 within the three dimensional pupil box movement area 255. In particular, in this example a grid 270 is illustrated of a number of individual positions that each represents the center of a pupil at that location, such as for position 270c corresponding to a pupil location of 250c and optical axis location 216. For each such position in the grid 270, a mapping is made of the display panel pixel locations to corresponding positions within a pupil centered at that grid position 270, such as by moving an image sensor in three dimensions for each such corresponding three dimensional pupil position, as well as to address the specific structure of the head-mounted display or other assembly that includes the optical lens. It will be appreciated that in other embodiments the multiple positions within the pupil box movement area may be arranged in manners other than a grid, and that in some embodiments multiple pupil locations may be assessed and mapped at the same time, such as by having different image sensors corresponding to different pupil locations simultaneously that each create a separate mapping for their respective pupil location given output from the display panel pixels in the manner discussed with respect to FIG. 2D.

After such pixel-to-pupil location mappings are made for each of the pupil positions 270 for this specific optical lens 220, a pupil location of a user may later be tracked during use of a device with that same optical lens 220 and display panel, in order to determine how to alter the image being displayed on the display panel 230 to correspond to the specific pupil location at which the user's eye is located. As noted elsewhere, various possible pupil tracking and eye tracking techniques may be used in different embodiments. For example, if a user's pupil location is determined to be at location 250c during such use, centered around defined pupil position 270c, the previously generated mapping for that defined pupil position may be used to determine how to alter the image being displayed on the display panel. In this example, in order to generate the test image of straight horizontal and vertical lines on the display panel, particular groups of one or more pixels may be chosen for each point on the display panel, in order to generate the image in the correct location within the visual representation of the pupil if centered at defined pupil position 270c. Furthermore, the particular groups of pixels are chosen for each point on the display so that any single point (e.g., any point on one of the lines) remains at a stable angular relationship to the pupil, regardless of the position of the eye in the eye box, so that the angle of light as it enters the pupil for any specific point in the view is correct based on its virtual distance to the eye (e.g., if something is far away, then parallax is minimal so the angular distance would not change noticeably, while the described techniques are used in at least some embodiments to adjust for parallax for closer objects due to movement of the eye in the eye box—in other embodiments, the same techniques are used to correct problems other than parallax, as discussed elsewhere herein). In addition, in at least some embodiments, different mappings and/or adjustments are made for different colors (e.g., for each of red, green and blue), such as to perform color and wavelength-specific corrections. For example, with respect to point 231a in the center of the display panel 230, pixel 281 may be determined to provide a corresponding display at that location. In a similar manner, combination aggregate pixel 282 may be determined to provide a visual representation of point 232a at its respective position in the pupil, which in this example includes different sub-pixels 282b, 282g and 282r at different locations within the display panel. Similarly, an aggregate pixel 283 is determined to provide the corresponding visual representation in the pupil for the display point 233a in this example. It will be appreciated that, while the pupil location is moved up both horizontally and vertically up and to the right (shown to the left in the image from the standpoint of the observer), that the translation of corresponding pixels in the display panel may vary in different manners, such as based on specific optical distortions (including imperfections) in this particular optical lens 220, such that the combination aggregate pixel 283 is generally to the left of the actual point 233a, while the new pixel 281 is generally to the right of its actual point 231a, and the combination aggregate pixel 282 is generally below its corresponding view location 232a. More generally, when determining what value to assign to any single physical pixel on the display, once the appropriate mapping is determined, sampling may be used in a source image for that pixel to include appropriate amounts from one or more neighboring pixels. Furthermore, while the generation and use of mapping information for different three dimensional pupil locations is discussed above, in some embodiments such calibration may further be performed for other types of distortions, such as from dynamically adjusting lenses (e.g., Alvarez lenses or electronically tunable lenses), which may have different distortion characteristics across the eyebox volume at different settings.

As previously noted, in some embodiments the described techniques may further include performing not only a three dimensional pupil location determination, but may further include performing activities to use information about one or more locations of the pupil to predict a future location of the pupil, such as by using two or more previous pupil locations and interpolating or extrapolating where a future location may be if movement continues in a similar manner. For example, if a determination is being made of how to adjust the display panel 230 at a current time, but the actual display will not occur for some period of future time (e.g., a specified number of milliseconds or seconds), such techniques may be performed to predict a location of the pupil at that specified future time, and to use that predicted future pupil location for use in adjusting the display panel image, so that the image that's actually displayed at that future time corresponds to that actual future pupil location (if the prediction is correct). Such pupil location prediction in some embodiments and situations include a simple linear translation based on recent movement, while other embodiments may use more detailed techniques, such as to use information about a specific user and/or about a specific series of images being displayed to predict that this particular user's eye location may change in a particular manner over the next period of time until the specified future time, and/or to predict that any given user's eye location will move in a particular manner based on particular images being displayed. In addition, in some embodiments, information may be obtained and used when displaying and adjusting an image about actual and/or predicted pupil locations at multiple times, including to combine that information in various ways (e.g., to take an average of the multiple locations), as discussed elsewhere herein. Examples of techniques that may be used some embodiments for such pupil location prediction are described in U.S. application Ser. No. 15/258, 551, filed Sep. 7, 2016 and entitled "Sensor Fusion Systems And Methods For Eye-Tracking Applications," which is incorporated by reference in its entirety.

FIG. 2G continues the examples of FIGS. 2A-2F, and in particular illustrates additional manners in which predefined mappings of display panel pixels to particular pupil locations for a particular optical lens 220 may be performed.

In the illustrated example of FIG. 2G, a central axis position 270d is illustrated in the visual representation for the eye location 240, along with position 270c as discussed with respect to FIG. 2F. As previously discussed, if a pupil location (whether actual or predicted) corresponds to a particular position such as 270c, the predetermined mapping for that particular view pupil location 270c may be used to determine the adjustments to be made to an image on the display panel in order to produce the desired visual representation on the iris at that pupil location.

Conversely, if a position of the pupil such as that as 270e is determined or predicted, which is between multiple predefined pupil positions 270f-270i but does not correspond exactly to a single one, various additional techniques may be used to adapt the corresponding image for the display panel to that intermediate pupil location 270e. For example, in some embodiments and situations, a nearest of the pupil positions 270 may be selected and used to adjust the image, such as in this example to use the mapping for pupil positions 270f to correspond to an actual or predicted pupil location of 270e. In other embodiments, two or more of the pupil positions 270f-270i may be selected and used together to represent the actual or predicted pupil location of 270e. For example, the information of the mappings for each of the four predefined positions 270f-270i may be combined together and aggregated (e.g., averaged) to create a new mapping corresponding to locations within those four predefined locations, such as by weighting the mapping information from the surrounding predefined positions based on their distance to the actual or predicted pupil location 270e, or instead by combining them all equally without weighting. Furthermore, when the predefined pupil locations 270 are tracked in three dimensions, the one or more pupil locations near an actual or predicted pupil position may similarly be measured in three dimensions, including in some embodiments and situations to select multiple predefined pupil locations that partially or fully surround the actual or predicted pupil position. Thus, various techniques for interpolating or extrapolating from one or more such predefined pupil locations to represent an actual or predicted pupil position, including in three dimensions, may be used in some embodiments.

Thus, in this manner, the pupil locations of a particular user may be tracked and optionally predicted, and those pupil locations may be used to perform optical lens-specific adjustments to an image being displayed in order to correct the optical distortions present in the optical lens and provide a corresponding visual representation at that pupil location that reduces or eliminates differences from that intended for the image. In addition, such techniques may be used for each image being displayed, such as for thirty frames per second by adapting each image in less than the time needed before the next frame is to be displayed, in order to provide continuous video that is adapted to the changing pupil locations of a user as he or she watches the respective images from the video and moves his or her pupil.

The use of the described techniques may provide various benefits, including to reduce or eliminate the effects of some or all of the types of optical distortion discussed herein. In particular, regardless of the pupil location, the use of the described techniques may provide the same or substantially same visual representation of an image to the user, such as to provide a visual representation to a user's pupil with light that is substantially collimated even if the pupil location is significantly off the central optical axis. In addition to these benefits, additional benefits in at least some such embodiments may further one or more of the following: increasing the effective field-of-view available to the user, reducing or eliminating the need for specialized optical lenses (e.g., Fresnel lenses), providing for user-specific optical distortion corrections, providing correction for HMD fit, providing eye relief correction, allowing use of highly distorting or non-collimating optics, etc.

FIG. 3 is a block diagram illustrating example computing devices and systems for performing at least some of the described techniques. In particular, FIG. 3 includes one or more server computing devices 300 that are suitable for performing at least some of the described techniques for identifying and mapping optical distortions specific to an optical lens, such as by executing an embodiment of a Lens Distortion Mapping system 342 that operates on behalf of one or more clients (e.g., a manufacturer of devices that include the optical lenses, a retailer that sells devices having the optical lenses to end users, etc.). In addition, FIG. 3 also includes one or more end-user devices 350 that are suitable for performing at least some of the described techniques for using mapped optical distortions specific to an optical lens to correct images displayed to a wearer or other user receiving images via the optical lens, such as by executing an embodiment of a Pupil Location Optical Distortion Correction system 365 that operates on behalf of one or more clients (e.g., a retailer that sells the devices 350 to end users, an end user operating a device 350, etc.). One or more optional other computing systems 390 are also illustrated, with the various devices interconnected via one or more computer networks 385 (e.g., the Internet, one or more cellular telephone networks, etc.), including to enable communications between the computing systems, devices, and any other systems or components implemented on them.

The example server computing device(s) 300 each includes one or more hardware processors 305 (e.g., one or more CPU processors, one or more GPU processors, etc.), various input/output ("I/O") components 310, storage 320, and memory 330. Illustrated I/O components in this example embodiment include a display 311, a network connection 312, a computer-readable media drive 313, and other I/O devices 315 (e.g., keyboards, mice or other pointing devices, microphones, speakers, etc.)—such I/O components may enable a variety of types of interaction types, including, for example, voice control, gesture control, etc. The example end-user devices 3350 are similarly illustrated as each having one or more hardware processors 351 (e.g., one or more CPU processors, one or more GPU processors, etc.), one or more I/O components 352, memory 357, and storage 354. While some of the details illustrated with respect to the server computing devices 300 are not illustrated with respect to the devices 350 and other computing systems 390, the devices 350 and system 390 may similarly include some or all of the same types of components as the server computing devices 300. The end-user devices 350 may further include additional components that are not illustrated with respect to device(s) 300, such as one or more optical lenses 367 and one or more other I/O devices 354 (e.g., one or more internal and/or external cameras, one or more speakers to provide sound to the ears of the wearer or other user, one or more pupil tracking systems, other types of movement sensors or other sensors, etc.). Similarly, if one or more of the other computing systems 390 operates in conjunction with one or more of the end-user devices 350, such as to provide motion tracking and/or image display capabilities, those other computing systems may similarly include additional components that are not illustrated with respect to device(s) 300.

In this example, a Lens Distortion Mapping system 342 is executing in memory 330 of the server computing device 300, along with one or more optional other programs 349. As discussed in greater detail elsewhere herein, the Lens Distortion Mapping system 342 may perform at least some of the described techniques for identifying and mapping optical distortions specific to an optical lens, such as with respect to one or more of the end-user devices 350 (e.g., as part of the manufacturing of the devices 350 before they are provided to respective end users). As part of its operation, the system 342 may generate and/or use various stored data, such as on storage 320, including data 321 about defined pupil location viewpoints for which to generate mapping data, data 323 about lens and/or the devices in which they are mounted or otherwise attached, and data 327 that results from performing the mapping operations. The generated mapping data 327 may further be used or provided to recipients in various manners, such as to store particular mapping data generated for one or more optical lenses of a particular end-user device 350 on that device for later use, such as on storage 356 of the end-user device 350 as data 357. While the Lens Distortion Mapping system 342 is implemented at least in part as a software system in this example, such as with corresponding software instructions that when executed program or otherwise configure the processor(s) 305 and the server computing device(s) 300 to perform automated operations that implement at least some of the described techniques, it may be implemented in other manners in other embodiments.

In addition, a Pupil Location Optical Distortion Correction system 365 is executing on the end-user device 300, such as in part or in whole as a software program (not shown) in memory 362, and in part or in whole as specialized hardware components (not shown) on the device 350. The memory 362 may further optionally store one or more image display programs 363 that generate or otherwise provide images to be displayed on the end-user device (e.g., on one or more display panels 352), along with one or more optional other programs 364, although in other embodiments an external system (e.g., one or more of the other computing systems 390) may instead supply some or all of the images to the device 350 to be displayed. As discussed in greater detail elsewhere herein, the Pupil Location Optical Distortion Correction system 365 may perform at least some of the described techniques for using mapped optical distortions specific to an optical lens to correct images displayed to a wearer or other user receiving images via the optical lens, such as for the one or more optical lenses 367 (e.g., as part of displaying images to one or more end users). As part of its operation, the system 365 may generate and/or use various stored data, such as on storage 356, including data 357 that maps particular display panel pixels to particular pupil location positions for one or more defined pupil locations, data 359 about pupil location tracking (e.g., as generated by one or more pupil tracking devices 353 or otherwise received from one or more external systems), and optionally one or more images 358 to display on the end-user device 350. The mapping data 357 may be received in various manners, such as from Lens Distortion Mapping system 342 on server computing device 300, although in other embodiments a single device or system (e.g., the end user device 350, server computing device 300, other computing system 390, etc.) may execute embodiments of both the Lens Distortion Mapping system and Pupil Location Optical Distortion Correction system.

It will be appreciated that the illustrated computing systems and devices are merely illustrative and are not intended to limit the scope of the present invention. For example, computing device(s) 300 and/or end-user device(s) 350 may be connected to other devices that are not illustrated, including through one or more networks such as the Internet or via the Web. More generally, such a computing system or device may comprise any combination of hardware that can interact and perform the described types of functionality, such as when programmed or otherwise configured with appropriate software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated systems 342 and/or 365 may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated systems are software-based systems including software instructions that, when executed by the processor(s) 305 and/or 355 and/or other processor means, program the processor(s) to automatically perform the described operations for that system. Furthermore, in some embodiments, some or all of the systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
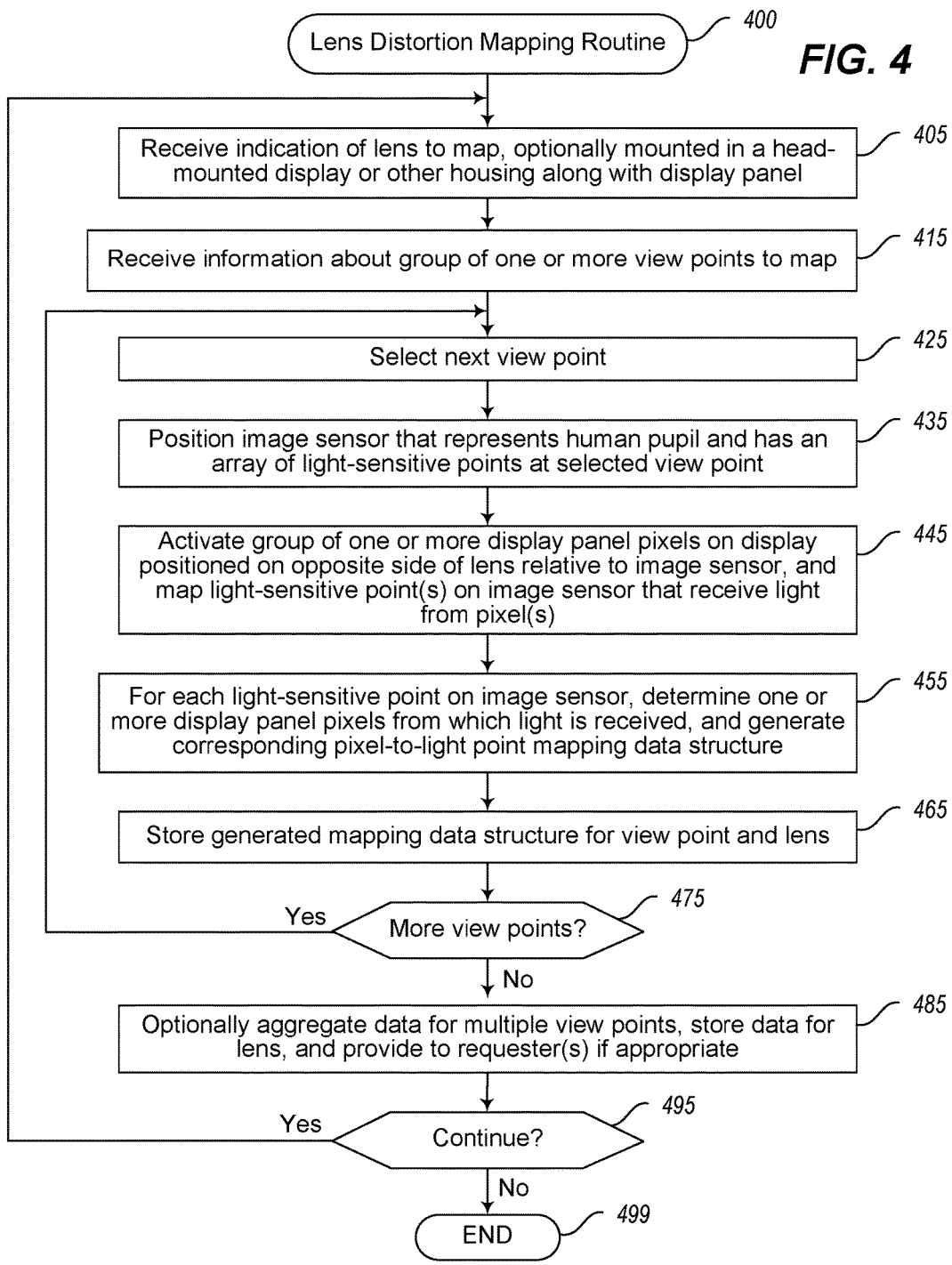
FIG. 4 illustrates an example embodiment of a Lens Distortion Mapping routine.

FIG. 4 is a flow diagram of an example embodiment of a Lens Distortion Mapping routine 400. The routine may be performed by, for example, a Lens Distortion Mapping system 342 of FIG. 3 and/or a system performing the lens distortion mapping operations discussed with respect to FIGS. 2D-2G and elsewhere herein, such as to generate information to correct the optical distortions of a particular optical lens (e.g., in a head-mounted display or other type of assembly) from multiple possible pupil locations in advance of use of the optical lens (e.g., in that head-mounted display or other type of assembly). While the illustrated example of the routine is performed for a single lens at a single time and for a single pupil location (referred to in the routine as a "viewpoint" of the pupil) at a time, it will be appreciated that such a routine may be used in other manners, including to simultaneously perform determinations for multiple optical lenses and/or for multiple such viewpoints. In addition, it will be appreciated that the illustrated embodiment of the routine may be implemented in software and/or hardware as appropriate, and may be performed by, for example, a system separate from an HMD or other device in which an optical lens is mounted, such as before use of the device by a user begins, although in other embodiments the actual HMD or other device may instead perform some or all of the mapping techniques, such as at the beginning of use for any users or for a specific user.

The illustrated embodiment of the routine begins at block 405, wherein an indication is received of an optical lens to map, with the optical lens optionally being mounted in a head-mounted display or other housing with a display panel (or other display device) to be used along with that optical lens. The routine then continues to block 415 to receive information about a group of one or more pupil location viewpoints to map, such as a single central optical axis pupil location viewpoint, or instead multiple different possible pupil location viewpoints within a pupil movement box area (with the central optical axis pupil location viewpoint optionally being one of the viewpoints).

The routine then continues to perform blocks 425-465 for each such pupil location viewpoint, in order to generate a mapping data structure for the optical lens and that pupil location viewpoint that includes information for mapping the display panel pixels to corresponding positions within an example pupil (represented in this example by an image sensor) at that pupil location viewpoint. In particular, the routine continues after block 415 to block 425 to select the next viewpoint to map, beginning with the first. In block 435, the routine then positions an image sensor, if not already so positioned, at that selected viewpoint location, with the image sensor representing the human pupil and having an array of light-sensitive points. After block 435, the routine continues to block 445 to successively activate groups of one or more display panel pixels on the display panel that is positioned opposite the lens relative to the image sensor, and to map one or more corresponding light-sensitive point positions on the image sensor that receive light from the activated one or more pixels. The procedure in block 445 continues until all pixels on the display panel are activated, although in other embodiments and situations only subsets of the display panel pixels may be activated (e.g., representative pixels at different locations, for only a subset of the display panel, etc.). After block 445, the routine continues to block 455 to determine, for each light-sensitive point position on the image sensor, one or more display panel pixels from which light was received at that image sensor point, such that activating those pixels will cause that position on the image sensor (or later, a pupil) to receive corresponding light. After the determination is made, the routine generates a corresponding pixel-to-pupil location position mapping data structure for the selected viewpoint in block 455, and in block 465 stores the generated mapping data structure for the viewpoint and the optical lens.

After block 465, the routine continues to block 475 to determine if there are more viewpoints to map, and if so returns to block 425 to select a next viewpoint. Otherwise, the routine continues to block 485 to optionally aggregate the data for multiple viewpoints that were mapped into an overall information data structure for use with the optical lens, store the data for the optical lens, and provide it to one or more requesters if appropriate (e.g., a requester who provided the instructions with respect to block 405).

After block 485, the routine continues to block 495 to determine whether to continue, such as until an explicit indication to terminate is received. If it is determined to continue, the routine returns to block 405 and waits for information about a next optical lens to map, and otherwise continues to block 499 and ends.

FIG. 5 is a flow diagram of an example embodiment of a Pupil Location Optical Distortion Correction routine 500. The routine may be performed by, for example, a Pupil Location Optical Distortion Correction system 365 of FIG. 3 and/or corresponding systems described with respect to FIGS. 2E-2G, such as to adjust one or more images to be displayed on a display panel (or other display device) in a manner specific to a particular optical lens and pupil location, and optionally to further adjust such information specific to a particular user. While the illustrated embodiment of the routine is displayed with respect to a particular image at a time, such as for a single image (whether by itself or as a part of a series of related images), it will be appreciated that other embodiments of the routine may be performed in other manners, such as to simultaneously adjust multiple images (e.g., to perform adjustments for multiple images to be displayed in rapid succession if the pupil location of the user is not expected to differ significantly between the display of those multiple images; to perform adjustments for two or more images to be simultaneously displayed via two or more display panels and associated optical lenses, such as for two optical lenses in an HMD; etc.). In addition, it will be appreciated that the illustrated embodiment of the routine may be performed by, for example, a particular HMD or other device in which the optical lens is included, such as dynamically while the images are received and presented, and may be implemented in software and/or hardware as appropriate.

The example embodiment of the routine begins at block 505, where an indication is received of an optical lens, and in which the routine obtains pixel-to-pupil location position mapping information for one or more pupil location viewpoints for the lens, such as information previously generated in FIG. 4 for that optical lens. After block 505, the routine continues to block 515, where it optionally obtains information about a specific user and any user-specific distortion corrections to apply or images displayed to that user (e.g., based on an analysis of the user-specific distortion corrections performed by the HMD or other device; based on information received from an external source, such as an optical exam; etc.), although in some embodiments such user-specific optical distortion corrections may not be used. In the illustrated example of the routine, the routine then continues to block 525 to initiate pupil tracking for the optical lens and the user, although in other embodiments one or more separate systems may be used to perform such pupil tracking, and the routine may instead receive pupil tracking information from those other systems.

The routine then continues to perform blocks 545-585 for each of one or more images to be displayed to the user through the optical lens, such as a series of image frames in a video, or instead a single stand-alone image. In particular, in block 545 the routine tracks the user's pupil location, such as periodically or continuously, such as for use with the next image to be displayed. As previously discussed, in some embodiments the pupil location may be determined using not only an actual current location but a predicted future location at a specified future time, such as to correspond to an amount of time before an adjusted image will actually be displayed to the user. In block 555, the routine then determines one or more of the nearest defined pupil location viewpoints for which the mapping information was generated that corresponds to the determined pupil location, and to retrieve the corresponding mapping information for those one or more nearest pupil viewpoints to use. Such a determination of one or more nearest defined pupil location viewpoints may be performed in various manners, such as by using a predefined or dynamically defined distance threshold (e.g., the distance to the nearest pupil location viewpoint, to the nearest four pupil location viewpoints, etc.). In addition, while not illustrated in this example routine, in some embodiments the routine may further obtain and use information about actual and/or predicted pupil locations at multiple times, and combine the information to determine a pupil position to use (e.g., to take an average of the multiple locations). For example, the actual and/or predicted pupil location may be determined at some time before a corresponding adjusted image will be displayed to the user, and that information may be combined with information about actual and/or predicted pupil location for other times such as at one or more previous times of displaying one or more previous images, at a later time of actually initiating the adjusting of the current image, etc.

The routine then obtains the next image to be displayed in block 560. In block 565, the routine then determines whether to use a single defined viewpoint or multiple defined viewpoints to adjust the image, although other embodiments of the routine may always use only a single viewpoint or always use multiple viewpoints. In the illustrated example of the routine, if it is determined to use a single defined viewpoint, such as if the determined pupil location is associated with a particular defined viewpoint (e.g., within a minimum threshold distance), the routine continues to block 575 to use the mapping information for that viewpoint to determine how to alter the pixel information to be displayed for the image, as well as to further optionally alter the image pixel information based on any user-specific information, such that an altered or modified set of pixels to illuminate is determined so that the desired image will be displayed at the determined pupil location given the optical lens distortions and any user-specific optical distortions.

If it is instead determined in block 565 to use multiple defined viewpoints, the routine continues instead to block 575 where two or more such defined viewpoints are selected to be used, and in which the mapping information for those multiple selected viewpoints is combined, optionally weighting the mapping information for the different viewpoints (e.g., based on the difference in location of the determined pupil location from those viewpoints, in one or more other defined manners, etc.). For example, if two selected viewpoints indicate two different pixels to illuminate for a particular pupil location position, both of those pixels may be illuminated, or instead one or more other pixels may be determined (e.g., by selecting one or more such other pixels between those two pixels). After block 575, the routine continues to block 580 to alter the pixel information for the image to be displayed based on the combined mapping information and optionally any user-specific information, in a manner similar to that discussed with respect to block 570.

After blocks 570 or 580, the routine continues to block 585 to output the altered image pixel information for display, whether directly to the display panel, or instead to another system or routine that performs the actual image display. The routine then continues to block 587 to determine whether there are more images to be altered in the described manner, and if so returns to block 535 to wait for the next image to be displayed. Otherwise, the routine continues to block 595 to determine whether to continue, such as until an explicit indication to terminate is received. If it is determined to continue, the routine returns to block 505 and waits for an indication of another lens for which such image modifications are to be performed, and otherwise continues to block 599 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. In addition, while certain aspects of the invention are presented at times in certain claim forms, or may not be embodied in any claims at some times, the inventors contemplate the various aspects of the invention in any available claim form. For example, while only some aspects of the invention may be recited at a particular time as being embodied in a computer-readable medium, other aspects may likewise be so embodied.

What is claimed is:

1. A method comprising:
attaching, to a head-mounted display device that includes a display panel, an optical lens between the display panel and an eye position area designed for a human eye to receive images generated by the display panel;
generating, by one or more computing systems, and for each of a plurality of pupil locations at the eye position area from which an image from the display panel may be received through the optical lens, optical distortion mapping information at the pupil location from the optical lens attached to the head-mounted display device, wherein the generating includes, for each of the plurality of pupil locations;
positioning an image sensor having an array of multiple light-sensitive positions at the pupil location;
for each of a plurality of different groups of pixels, successively activating the group of pixels on the display panel and determining resulting light-sensitive positions of the image sensor that receive light from the activated group of pixels through the optical lens; and
storing an optical distortion mapping data structure for the optical lens and the pupil location that maps light-sensitive positions at the pupil location to corresponding pixels on the display panel; and
using, by at least one hardware processor associated with the head-mounted display, the generated optical distortion mapping information to display images through the optical lens to a human eye at the eye position area, including, for each of the images:
determining an actual pupil location of a pupil of the human eye using pupil tracking capabilities of the head-mounted display;
selecting one or more of the pupil locations of the plurality that are within a defined distance of the determined actual pupil location;
using the generated optical distortion mapping information in one or more stored optical distortion mapping data structures for the selected one or more pupil locations as part of adjusting the image to reduce optical distortions caused by the optical lens at the determined actual pupil location, including to change locations of pixels to be activated for the adjusted image to cause light received at the determined pupil location to correspond to the image before adjustment; and
displaying the adjusted image on the display panel.

2. The method of claim 1 wherein the head-mounted display device further includes a second optical lens between a second display panel and a second eye position area designed for a second human eye to receive images generated by the second display panel, and wherein the method further comprises:
generating, by one or more computing systems, and for each of a plurality of second pupil locations at the second eye position area from which an image from the second display panel may be received through the second optical lens, second optical distortion mapping information for the second optical lens at the second pupil location, wherein the second optical distortion mapping information is specific to the second optical lens and is separate from the optical distortion mapping information for the optical lens; and
using, by at least one hardware processor associated with the head-mounted display, the generated second optical distortion mapping information to display second images through the second optical lens to a second human eye at the second eye position area, including, for each of the second images:
determining a second actual pupil location of a second pupil of the second human eye using the pupil tracking capabilities of the head-mounted display;
selecting one or more of the second pupil locations that are within the defined distance of the determined second actual pupil location;
using the generated second optical distortion mapping information for the selected one or more second pupil locations as part of adjusting the second image to reduce optical distortions caused by the second optical lens at the determined second actual pupil location; and
displaying the adjusted second image on the second display panel.

3. The method of claim 2 wherein the displayed images and the displayed second images are frames of recorded or generated video information, and wherein the using of the generated optical distortion mapping information to display the images and the using of the generated second optical distortion mapping information to display the second images is performed in a real-time manner to display the video information at a defined rate that includes multiple frames per second.

4. A computer-implemented method comprising:
generating, by one or more hardware processors, and for an optical lens positioned between a display device and an eye position area having a plurality of pupil locations at which an image from the display device may be received through the optical lens, optical distortion mapping information for each of the plurality of pupil locations, wherein the generating includes, for each of the plurality of pupil locations, successively activating different groups of pixels on the display device and determining resulting positions at the pupil location that receive light from the activated groups of pixels through the optical lens; and
using, by at least one hardware processor, the generated optical distortion mapping information to display one or more images through the optical lens to a human eye, including, for each of the one or more images:
determining a pupil location of a pupil of the human eye;
selecting one or more pupil locations of the plurality that are within a defined distance of the determined pupil location;
using the generated optical distortion mapping information for the selected pupil locations as part of adjusting the image to reduce optical distortions caused by the optical lens, including to change locations of pixels to be activated on the display device for the adjusted image to cause light received at the determined pupil location to correspond to the image before adjustment; and initiating display of the adjusted image on the display device.

5. The computer-implemented method of claim 4 wherein the using of the generated optical distortion mapping information for one of the one or more images includes performing the selecting of the one or more pupil locations for the one image by identifying one pupil location of the plurality that is closest to the determined pupil location for the one image, approximating optical distortion mapping information for the determined pupil location for the one image by using a distance between the determined pupil location and the identified one location to modify the optical distortion mapping information for the identified one pupil location, and using the approximated optical distortion mapping information for the adjusting of the one image.

6. The computer-implemented method of claim 5 wherein the one or more images include multiple images, wherein the using of the generated optical distortion mapping information for a second image of the multiple images includes performing the selecting of the one or more pupil locations for the second image by identifying multiple pupil locations of the plurality that are within the defined distance to the determined pupil location for the second image, approximating optical distortion mapping information for the determined pupil location for the second image by combining the optical distortion mapping information for the identified multiple pupil locations, and using the approximated optical distortion mapping information for the adjusting of the second image.

7. The computer-implemented method of claim 5 wherein the adjusting of the one image includes, for each of at least some pixels of a plurality of pixels to activate for the one image, determining one or more other pixels of the plurality to activate to cause light to be displayed at a position in the determined pupil location corresponding to the pixel.

8. The computer-implemented method of claim 4 wherein the using of the generated optical distortion mapping information for one of the one or more images includes performing the selecting of the one or more pupil locations for the one image by identifying multiple pupil locations of the plurality that are within the defined distance to the determined pupil location for the one image and surround the determined pupil location at least in part, approximating optical distortion mapping information for the determined pupil location for the one image by using combining the optical distortion mapping information for the identified multiple pupil locations, and using the approximated optical distortion mapping information for the adjusting of the one image.

9. The computer-implemented method of claim 8 wherein the adjusting of the one image includes, for each of at least some pixels of a plurality of pixels to activate for the one image, determining one or more other pixels of the plurality to activate to cause light to be displayed at a position in the determined pupil location corresponding to the pixel.

10. The computer-implemented method of claim 4 wherein the adjusting of an image to reduce optical distortions caused by the optical lens further includes obtaining information about additional optical distortions specific to the human eye to which the image is to be displayed, and further adjusting the image to correct the additional optical distortions.

11. The computer-implemented method of claim 4 wherein the activated pixels are each a subpixel configured to, in operation, emit light of one of red, green or blue from use of different emissive materials or use of different color filters.

12. The computer-implemented method of claim 4 wherein the determining of the pupil location of the pupil includes using pupil tracking capabilities to determine a current actual pupil location, and adjusting the determined current actual pupil location to reflect a predicted future location of the pupil at a future time at which the display of the adjusted image on the display device is to occur.

13. The computer-implemented method of claim 4 wherein the optical lens and the display device are part of a head-mounted display, wherein the human eye is an eye of a human wearing the head-mounted display, and wherein the at least one hardware processor includes a graphics processing unit of the head-mounted display.

14. The computer-implemented method of claim 13 wherein the one or more processors are part of one or more computing systems involved in manufacturing of the head-mounted display.

15. The computer-implemented method of claim 4 wherein the optical lens and the display device are part of one or more of a camera, a telescope, a microscope, a surveying scope or binoculars.

16. The computer-implemented method of claim 4 wherein the display device includes a plurality of pixels, and wherein the generating of the optical distortion mapping information for the optical lens and for each of the plurality of pupil locations includes:

positioning an image sensor having multiple light-sensitive positions at the pupil location;

successively activating the different groups of one or more pixels on the display device and determining resulting light-sensitive positions of the image sensor that receive light from the activated groups of pixels through the optical lens, wherein the one or more pixels in a first group comprises pixels that emit only a first color, and the one or more pixels in a second group comprises pixels that emit only a second color different from the first color; and storing an optical distortion mapping data structure for the optical lens and the pupil location that maps light-sensitive positions at the pupil location to corresponding pixels on the display device.

17. The computer-implemented method of claim 16 wherein each of the plurality of pupil locations includes a plurality of positions within the pupil location, and wherein the generating of the optical distortion mapping information for the optical lens and for each of the plurality of pupil locations further includes determining, for each of the plurality of positions within the pupil location, one or more pixels of the plurality of pixels that provide light to the position for the pupil location.

18. A non-transitory computer-readable medium having stored contents that cause at least one hardware processor to perform activities that include at least:

obtaining, for an optical lens positioned between a display device and an eye position area having a plurality of pupil locations at which an image from the display device may be received through the optical lens, optical distortion mapping information for each of multiple pupil locations of the plurality, wherein the obtaining of the optical distortion mapping information includes generating, for each of the multiple pupil locations, the optical distortion mapping information for that pupil location by successively activating different groups of pixels on the display device and determining resulting positions at that pupil location that receive light from the activated pixels through the optical lens, and storing a resulting optical distortion mapping data structure for the optical lens and that pupil location; and using, by the at least one hardware processor, the optical distortion mapping information to display one or more images through the optical lens to a human eye, including, for each of the one or more images:
  determining a pupil location of a pupil of the human eye;
  determining a distance from the determined pupil location to at least one pupil location of the multiple pupil locations;
  using the optical distortion mapping information and the determined distance as part of adjusting the image to reduce optical distortions caused by the optical lens, including to change locations of pixels to be activated on the display device for the adjusted image to cause light received at the determined pupil location to correspond to the image before adjustment; and
  initiating display of the adjusted image on the display device.

19. The non-transitory computer-readable medium of claim 18 wherein the one or more pupil locations of the plurality include multiple pupil locations,
  wherein the obtaining of the optical distortion mapping information includes modeling optical characteristics of the optical lens, and generating, for each of the multiple pupil locations and based at least in part on the modeled optical characteristics, the optical distortion mapping information for that pupil location by simulating activation of pixels on the display device and determining resulting positions at that pupil location that receive light from the simulated activated pixels through the optical lens, and storing a resulting optical distortion mapping data structure for the optical lens and that pupil location, and
  wherein the performing of the activities further includes selecting the at least one pupil location of the multiple locations to use the adjusting based at least in part on the determining distance.

20. The non-transitory computer-readable medium of claim 18 wherein the determining of the pupil location of the pupil includes using pupil tracking capabilities to determine a current actual pupil location, and adjusting the determined current actual pupil location to reflect a first predicted future location of the pupil at a future time at which the display of the adjusted image on the display device is to occur.

21. The non-transitory computer-readable medium of claim 20 wherein the determining of the pupil location occurs at a first time, wherein the using of the optical distortion mapping information occurs at a second time and includes predicting at the second time a second future location of the pupil for the future time at which the display of the adjusted image on the display device is to occur, and wherein the adjusting of the image to reduce optical distortions caused by the optical lens includes combining information about the first predicted future location and the second predicted future location.

22. The non-transitory computer-readable medium of claim 18 wherein the at least one hardware processor includes at least one graphics processing unit in a head-mounted display that includes the display device and the optical lens and the eye position area and a pupil tracking system, and wherein the determining of the pupil location includes using the pupil tracking system as part of the determining.

23. The non-transitory computer-readable medium of claim 18 wherein the computer-readable medium is a memory of a computer system that includes the at least one hardware processor, and wherein the stored contents are instructions that, when executed, program the computer system to perform the activities.

24. A system, comprising:
  one or more hardware processors; and
  a pupil location optical distortion correction system that is configured to cause at least one of the one or more hardware processors to perform activities including:
    obtaining, for an optical lens positioned between a display device and an eye position area having a plurality of pupil locations at which an image from the display device may be received through the optical lens, optical distortion mapping information for each of multiple pupil locations of the plurality, wherein the obtaining of the optical distortion mapping information includes generating, for each of the multiple pupil locations, the optical distortion mapping information for that pupil location by successively activating different groups of pixels on the display device and determining resulting positions at that pupil location that receive light from the activated pixels through the optical lens, and storing a resulting optical distortion mapping data structure for the optical lens and that pupil location; and
    using the optical distortion mapping information to display one or more images through the optical lens to a human eye, including, for each of the one or more images:
      obtaining information about a pupil location of a pupil of the human eye;
      selecting one or more pupil locations of the multiple pupil locations based at least in part on respective distances between the selected one or more pupil locations and the determined pupil location;
      using the optical distortion mapping information for the selected pupil locations as part of adjusting the image to reduce optical distortions caused by the optical lens, including to change locations of pixels to be activated on the display device for the adjusted image to cause light received at the determined pupil location to correspond to the image before adjustment; and
      initiating display of the adjusted image on the display device.

25. The system of claim 24 further comprising a lens distortion mapping system that is configured to cause at least one of the one or more hardware processors to generate the obtained optical distortion mapping information for each of the plurality of pupil locations by, for each of the multiple pupil locations, activating pixels on the display device and determining resulting positions at the pupil location that receive light from the activated pixels through the optical lens, and storing a resulting optical distortion mapping data structure for the optical lens and the pupil location.

26. The system of claim 24 further comprising a pupil tracking system, and wherein the obtaining of the information about the pupil location includes using the pupil tracking system to determine the pupil location.

27. The system of claim 24 further comprising a head-mounted display that includes the display device and the optical lens and the eye position area, and wherein the one or more hardware processors include at least one graphics processing unit in the head-mounted display.

28. The system of claim 24 wherein the pupil location optical distortion correction system includes software instructions for execution by at least one of the one or more hardware processors.

\* \* \* \* \*